(12) United States Patent
Yamamoto et al.

(10) Patent No.: US 8,727,053 B2
(45) Date of Patent: May 20, 2014

(54) VEHICLE

(75) Inventors: Akihiro Yamamoto, Saitama (JP); Sei Shinohara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/387,693

(22) PCT Filed: Jul. 30, 2010

(86) PCT No.: PCT/JP2010/062957
§ 371 (c)(1),
(2), (4) Date: Jan. 27, 2012

(87) PCT Pub. No.: WO2011/013829
PCT Pub. Date: Feb. 3, 2011

(65) Prior Publication Data
US 2012/0118652 A1 May 17, 2012

(30) Foreign Application Priority Data
Jul. 31, 2009 (JP) .................................. 2009-180061

(51) Int. Cl.
*B60K 1/02* (2006.01)

(52) U.S. Cl.
USPC .............................. 180/65.6; 180/69.6; 477/6

(58) Field of Classification Search
USPC ......... 180/65.6, 65.285, 69.6, 62; 290/4 R, 9, 290/14; 701/22; 303/151, 152; 477/3–6; 903/903, 911
See application file for complete search history.

(56) References Cited

U.S. PATENT DOCUMENTS

| | | | | |
|---|---|---|---|---|
| 4,928,227 A | * | 5/1990 | Burba et al. | 701/66 |
| 6,024,182 A | * | 2/2000 | Hamada et al. | 180/6.28 |
| 6,105,704 A | | 8/2000 | Hamada et al. | |
| 6,325,736 B1 | | 12/2001 | Hamada et al. | |
| 6,459,980 B1 | * | 10/2002 | Tabata et al. | 701/70 |
| 7,386,379 B2 | * | 6/2008 | Naik et al. | 701/41 |
| 2002/0123409 A1 | * | 9/2002 | Suzuki et al. | 477/3 |
| 2005/0209763 A1 | * | 9/2005 | Offerle et al. | 701/83 |
| 2009/0036246 A1 | * | 2/2009 | Bucknor et al. | 475/5 |
| 2009/0054202 A1 | * | 2/2009 | Yamakado et al. | 477/6 |
| 2009/0118882 A1 | * | 5/2009 | Heap et al. | 701/22 |
| 2009/0159350 A1 | * | 6/2009 | Hanada et al. | 180/65.265 |

FOREIGN PATENT DOCUMENTS

| | | |
|---|---|---|
| JP | 11-099838 A | 4/1990 |
| JP | 09-079348 A | 3/1997 |
| JP | 11-208304 A | 8/1999 |
| JP | 2004-088984 A | 3/2004 |
| JP | 2011-031746 A | 2/2011 |

\* cited by examiner

*Primary Examiner* — Jeffrey J Restifo
*Assistant Examiner* — Steve Clemmons
(74) *Attorney, Agent, or Firm* — Arent Fox LLP

(57) ABSTRACT

In the case where a vehicle 3 runs forward, when both two electric motors 2A, 2B power the vehicle, an oil pressure controller 48 releases hydraulic brakes 60A, 60B; when both the two electric motors 2A, 2B perform a regenerative braking, actuates the hydraulic brakes 60A, 60B. When one of the two electric motors 2A, 2B powers the vehicle and the other motor performs regenerative braking, the oil pressure controller 48 controls releases or actuates the hydraulic brakes 60A, 60B based on a power driving torque and a regenerative braking torque.

3 Claims, 25 Drawing Sheets

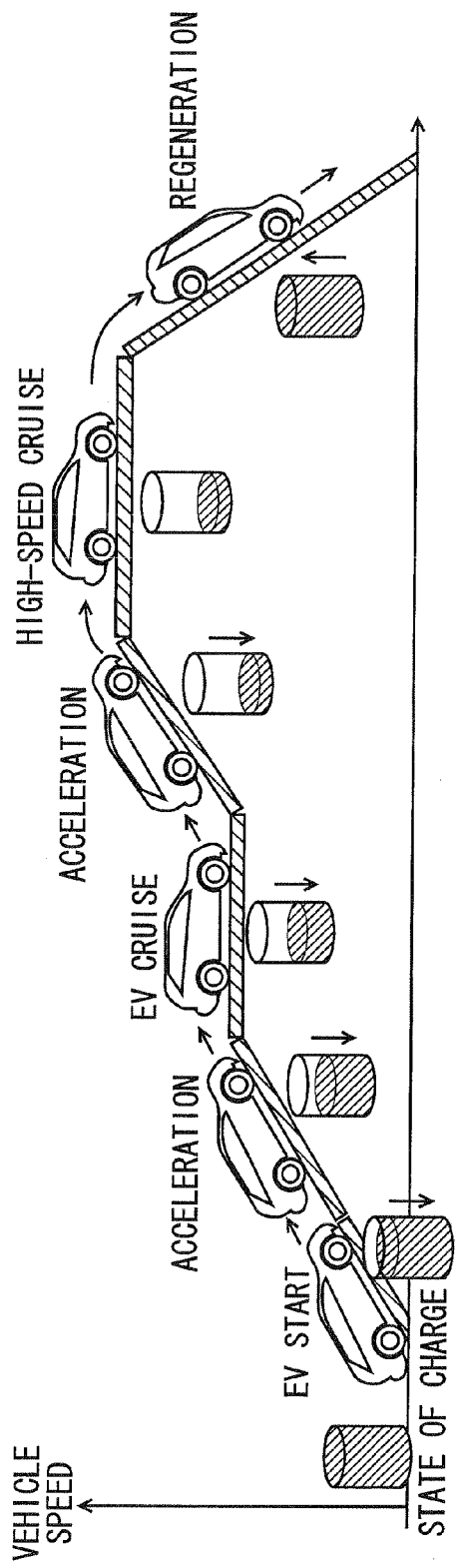

FIG. 17

| STATE OF VEHICLE | FRONT | REAR | STATE OF MOT | DECOUPLING MECHANISM | LINE PRESSURE |
|---|---|---|---|---|---|
| STOP | — | — | STOP OF MOT | — | — |
| EV START | × | ○ | DRIVING OF MOT | ON | LOW PRESSURE |
| ACCELERATION | ○ | ○ | DRIVING OF MOT | ON | LOW PRESSURE |
| EV CRUISE | × | ○ | DRIVING OF MOT | ON | LOW PRESSURE |
| HIGH-SPEED CRUISE | ○(ENG RUN) | × | STOP OF MOT | OFF | LOW PRESSURE |
| NATURAL DECELERATION | ○(ENG RUN) | × | STOP OF MOT | OFF | LOW PRESSURE |
| DECELERATION REGENERATION | × OR ○ | ○ | REGENERATION OF MOT | ON | BRK ENGAGEMENT HIGH PRESSURE |
| ABS IS OPERATED | × | × | STOP OF MOT | OFF | LOW PRESSURE |
| RVS | × OR ○ | ○ | REVERSING OF MOT | ON | BRK ENGAGEMENT HIGH PRESSURE |
| FWD TOWED | × | × | STOP OF MOT | OFF | OWC FREE LOW PRESSURE |
| FAIL (FAILURE OF HIGH-VOLTAGE SYSTEM) COUNTERMEASURE | ○(ENG RUN) | × | STOP OF MOT | OFF | OWC FREE LOW PRESSURE |

VEHICLE

CROSS-REFERENCE TO RELATED APPLICATION

This Application is a National Stage entry of International Application No. PCT/JP2010/62957, having an international filing date of Jul. 30, 2010; which claims priority to Japanese Application No.: 2009-180061, filed Jul. 31, 2009; the disclosure of each of which is hereby incorporated in its entirety by reference.

TECHNICAL FIELD

The present invention relates to a vehicle including two electric motors which can independently output driving forces to right and left drive shafts, respectively.

BACKGROUND ART

In a vehicle described in Patent Reference 1, as shown in FIGS. 24 and 25, front wheels LWf, RWf are driven by a main driving source 103 such as an engine 101 and a first motor 102, and left and right rear wheels LWr, RWr of the vehicle 100 are driven by second motors 104a, 104b which are auxiliary driving sources, through a planetary gear reducer 105.

In each of the second motors 104a, 104b, a rotor 106 is coupled to a sun gear 105a of the planetary gear reducer 105, and a stator 107 is coupled to a ring gear 105b of the planetary gear reducer 105, and a rear axle 108a or 108b is coupled to a carrier 105c. In the vehicle 100, there is disclosed a series drive mode in which electric power is generated in the first motor 102 by the power of the engine 101, and the vehicle is propelled by the driving forces of the second motors 104a, 104b, and a parallel drive mode in which the front wheels LWf, RWf are driven by the power of the engine 101, and the rear wheels LWr, RWr are driven by the driving forces of the second motors 104a, 104b.

PRIOR ART REFERENCE

Patent Reference

Patent Reference 1: JP-A-11-208304

SUMMARY OF THE INVENTION

Problem that the Invention is to Solve

In the vehicle of Patent Reference 1, however, the rotor 106 is coupled to the sun gear 105a of the planetary gear reducer 105, and the stator 107 is integrally coupled to the ring gear 105b of the planetary gear reducer 105, and therefore there is a problem in that the second motors 104a, 104b are always rotated together with the rear axles 108a, 108b, and cannot be decoupled from the rear axles 108a.

Patent Reference 1 does not disclose such a configuration that, by using the rotational difference between the second motors 104a, 104b caused by turning of the vehicle, one of them performs power driving, and the other performs regeneration.

The invention has been made in view of the above-discussed problem. It is an object of the invention to provide a vehicle that can perform a control in which one of two electric motors that are detachably coupled to right and left drive shafts, respectively is driven, and the other performs regeneration.

Means for Solving the Problems

In order to attain the object, the vehicle of claim 1 is a vehicle (for example, a vehicle 3 of an embodiment which will be described later) including: two electric motors (for example, electric motors 2A, 2B in the embodiment which will be described later) configured to output driving forces to right and left drive shafts independently, respectively (for example, axles 10A, 10B in the embodiment which will be described later); planetary gear reducers (for example, planetary gear reducers 12A, 12B in the embodiment which will be described later) disposed on power transmission paths between the drive shafts and the electric motors; a one-way power transmitting device (for example, a one-way clutch 50 in the embodiment which will be described later) disposed between first rotation elements (for example, ring gears 24A, 24B in the embodiment which will be described later) of the planetary gear reducers and a reducer case (for example, a reducer case 11 in the embodiment which will be described later) that accommodates the planetary gear reducers therein so as to transmit one-way rotational power; a brake (for example, hydraulic brakes 60A, 60B in the embodiment which will be described later) that connects/disconnects the first rotation elements and the reducer case, and configured to transmit two-way rotational powers of the electric motors to the drive shafts in a connection state; a running state estimator (for example, a running state estimator 46 in the embodiment which will be described later) which estimates a running state of the vehicle; a torque calculator (for example, a torque calculator 47 in the embodiment which will be described later) which calculates torques of the two electric motors; and a controller (for example, an oil pressure controller 48 in the embodiment which will be described later) which controls the brake based on the running state of the vehicle estimated by the running state estimator. When the vehicle runs forward and both the two electric motors power the vehicle, the controller releases the brake. When the vehicle runs forward and both the two electric motors perform regenerative braking, the controller actuates the brake. When the vehicle runs forward and one of the two electric motors powers the vehicle while the other motor performs regenerative braking, the controller releases or actuates the brakes based on a power driving torque of said one of the two electric motors that powers the vehicle and a regenerative braking torque of the other motor that performs regenerative braking.

According to the invention of claim 2, in addition to the configuration of claim 1, When one of the two electric motors powers the vehicle and the other motor performs regenerative braking and the regenerative braking torque is larger than the power driving torque, the controller actuates the brake.

According to the invention of claim 3, in addition to the configuration of claim 1 or 2, the running state estimator estimates the running state of the vehicle based on a vehicle speed, an accelerator opening degree, and a steering angle of the vehicle.

Effects of the Invention

According to the invention of claim 1, the planetary gear reducers are disposed on the power transmission paths between the drive shafts and the electric motors, and the one-way power transmitting device and the brakes are disposed between the first rotation elements of the planetary gear reducers and the reducer case. Therefore, the electric motors can be decoupled from the right and left drive shafts, respectively, and hence can be prevented from being co-rotated.

When the vehicle runs forward and one of the two electric motors powers the vehicle while the other motor performs regenerative braking, the controller releases or actuates the brakes based on a power driving torque and a regenerative braking torque. By using the rotational difference between the two electric motors during turning of the vehicle, therefore, one of them can perform power driving, and the other can perform regeneration.

According to the invention of claim 2, when one of the two electric motors drives the vehicle and the other motor performs regeneration and the regenerative braking torque is larger than the power driving torque, the controller actuates the brakes. When the power driving torque is larger, therefore, it is not required to cause the brakes to be engaged. When the power driving torque acts, such as when the vehicle is started to run, consequently, the one-way power transmitting device is actuated. In the case where the brakes are configured by, for example, hydraulic brakes, therefore, the responsibility in starting of the vehicle can be improved, and a situation where an electric oil pump is operated in a high-pressure mode in a state where the oil temperature is low can be prevented from occurring.

According to the invention of claim 3, the running state estimator estimates the running state of the vehicle based on a vehicle speed, an accelerator opening degree, and a steering angle of the vehicle.

BRIEF DESCRIPTION OF THE DRAWINGS

FIG. 17 is a view showing the states of the electric motors, a decoupling mechanism, and a line pressure in the running state of the vehicle.

MODE FOR CARRYING OUT THE INVENTION

First, an embodiment of the vehicle of the invention will be described.

Figure 1:
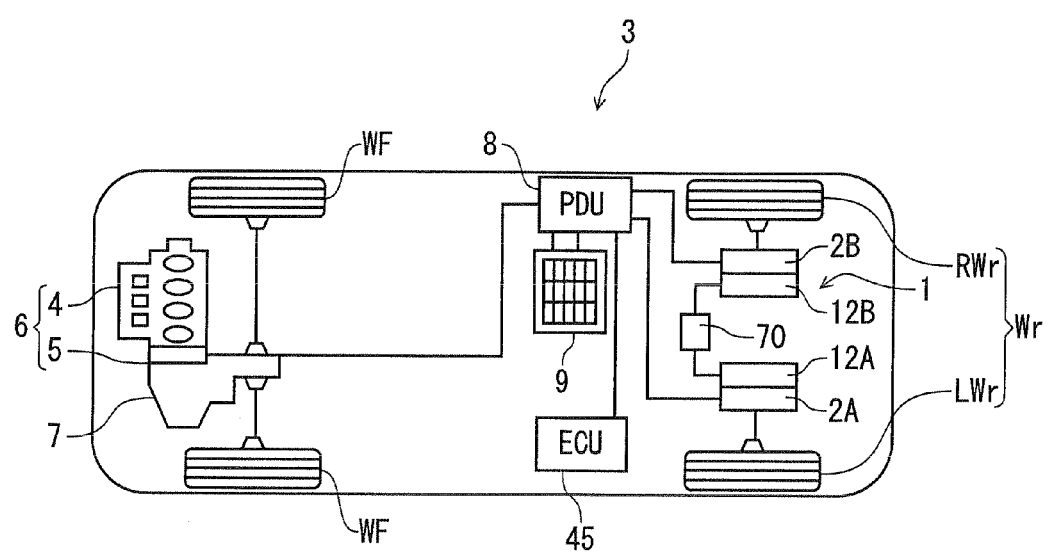
FIG. 1 is a block diagram schematically showing the configuration of a hybrid vehicle according to a vehicle of an embodiment of the invention.

A vehicle 3 shown in FIG. 1 is a hybrid vehicle having a driving unit 6 in which an internal combustion engine 4 and an electric motor 5 are connected to each other in series, in a front portion of the vehicle. The power of the driving unit 6 is transmitted to front wheels Wf through a transmission 7, and the power of a driving apparatus 1 which is disposed separately from the driving unit 6 and in a rear portion of the vehicle is transmitted to rear wheels Wr (RWr, LWr). In the driving apparatus 1, electric motors 2A, 2B are used as a driving source for diving axles. The electric motor 5 of the driving unit 6, and the electric motors 2A, 2B of the driving apparatus 1 on the side of the rear wheels Wr are connected to batteries 9 through a PDU 8 (Power Drive Unit). Thus, a supply of electric power from the batteries 9, and energy regeneration to the batteries 9 are performed through the PDU 8. The PDU 8 is connected to an ECU 45 which will be described later.

Figure 3:
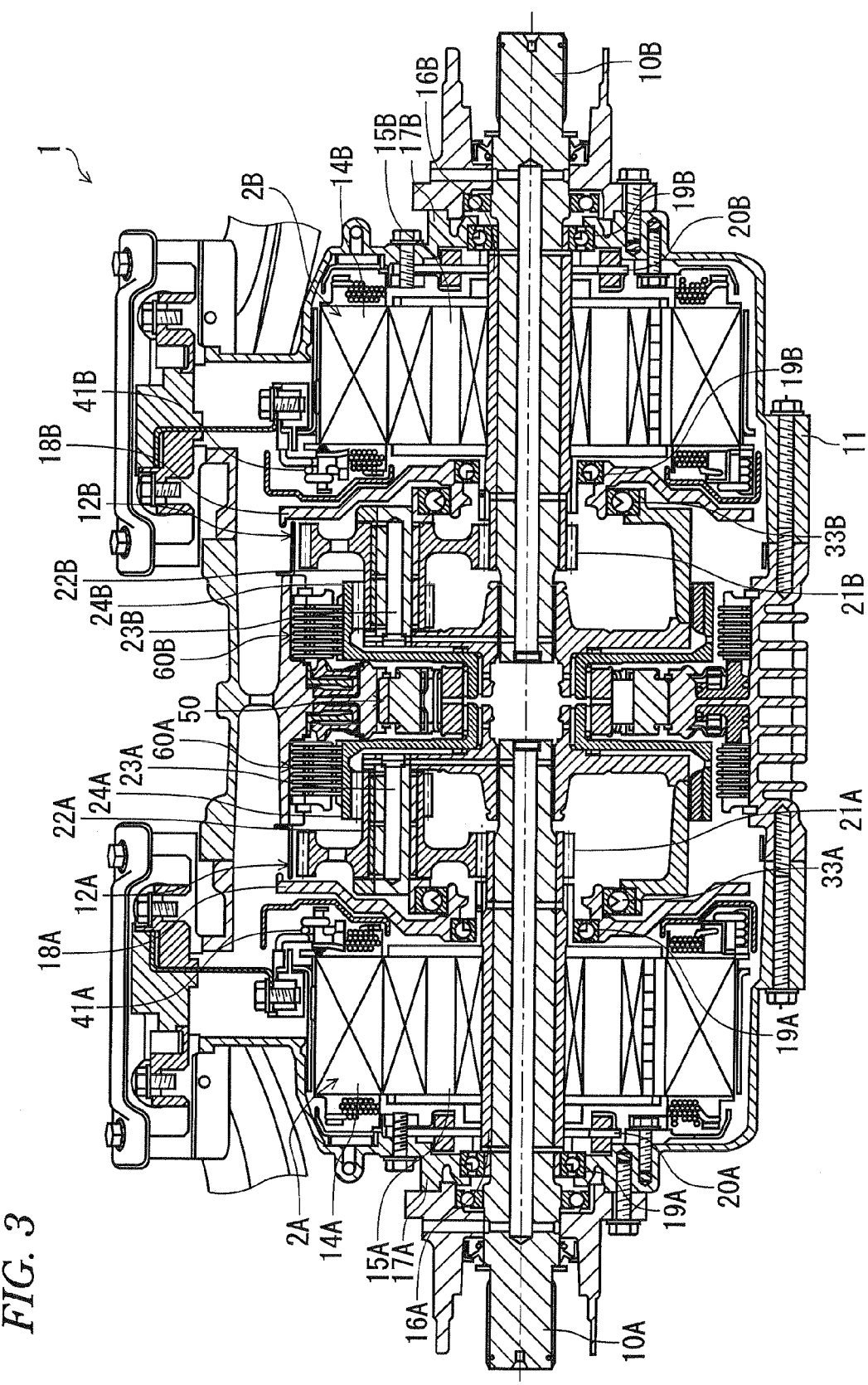
FIG. 3 is a longitudinal sectional view of a driving apparatus which is mounted on the vehicle of the invention.
Figure 5:
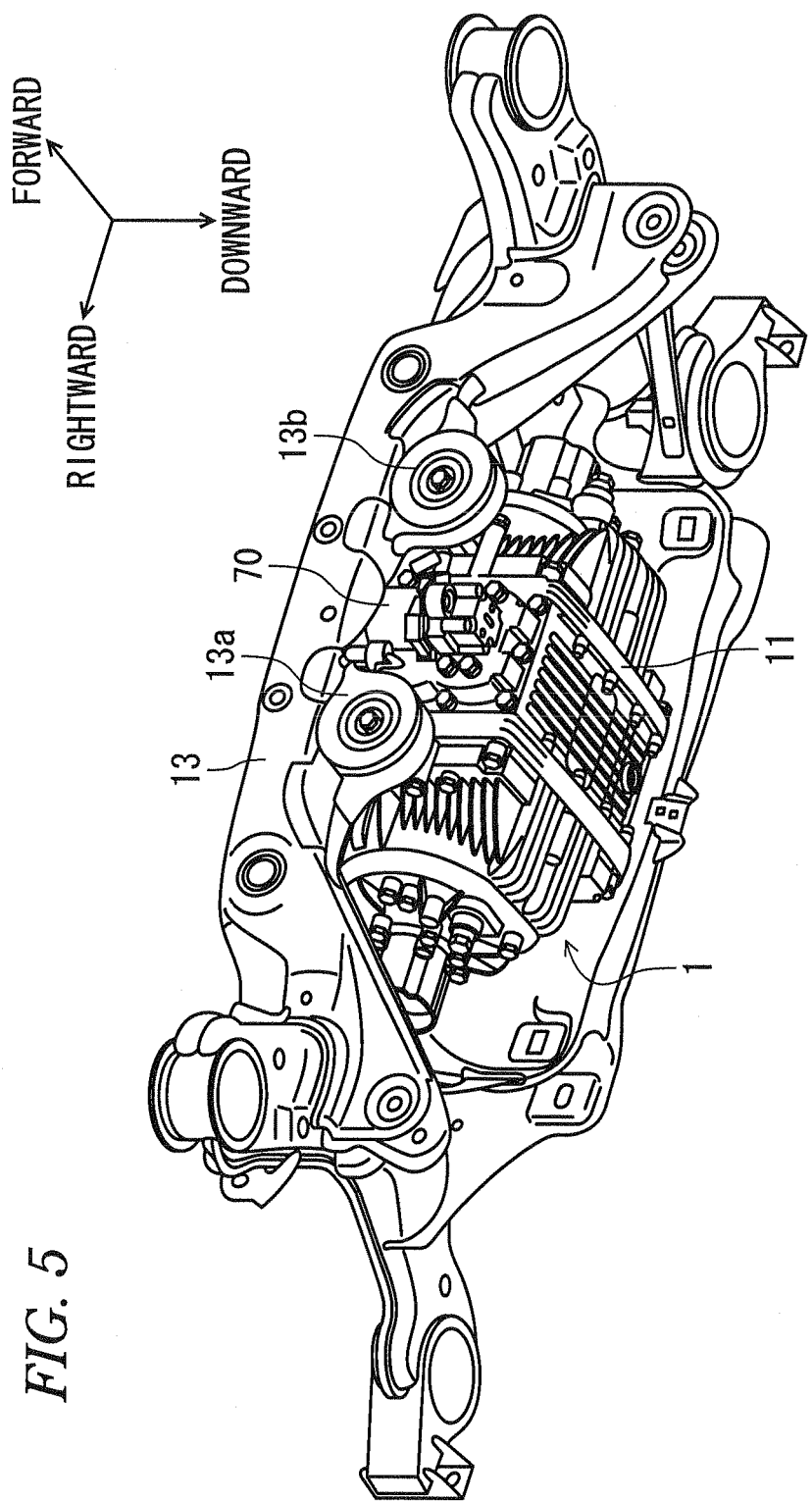
FIG. 5 is a perspective view showing the driving apparatus mounted on a frame.

FIG. 3 is a longitudinal sectional view of the whole driving apparatus 1. In the figure, 10A, 10B denote right and left axles which are on the side of the rear wheels Wr of the vehicle, and which are coaxially placed in the vehicle width direction. A reducer case 11 of the driving apparatus 1 is formed into a substantially cylindrical shape as a whole. In the case, the electric motors 2A, 2B for driving the axles, and planetary gear reducers 12A, 12B which reduce driving rotations of the electric motors 2A, 2B are placed coaxially with the axles 10A, 10B. The electric motor 2A and the planetary gear reducer 12A control the left rear wheel LWr, the electric motor 2B and the planetary gear reducer 12B control the right rear wheel LWr, and the electric motor 2A and the planetary gear reducer 12A, and the electric motor 2B and the planetary gear reducer 12B are placed bilaterally symmetrically in the vehicle width direction in the reducer case 11. As shown in FIG. 5, the reducer case 11 is supported by supporting portions 13a, 13b of a frame member 13 which is a part of a frame constituting the framework of the vehicle 3, and a frame (not shown) of the driving apparatus 1. The supporting portions 13a, 13b are laterally disposed about the center of the frame member 13 in the vehicle width direction. The arrows in FIG. 5 indicate positional relationships in the state where the driving apparatus 1 is mounted on the vehicle.

Stators 14A, 14B of the electric motors 2A, 2B are fixed to the interiors of the left and right end sides of the reducer case 11, and annular rotors 15A, 15B are rotatably placed on the circumferential sides of the stators 14A, 14B, respectively. Cylindrical shafts 16A, 16B which surround the outer circumferences of the axles 10A, 10B are coupled to inner circumferential portions of the rotors 15A, 15B. The cylindrical shafts 16A, 16B are supported by end walls 17A, 17B and middle walls 18A, 18B of the reducer case 11 through bearings 19A, 19B so that the shafts are coaxial with and relatively rotatable with respect to the axles 10A, 10B. Resolvers 20A, 20B which feeds back rotational position information of the rotors 15A, 15B to controllers (not shown) for the electric motors 2A, 2B are disposed on the outer circumferences of one-end sides of the cylindrical shafts 16A, 16B and on the end walls 17A, 17B of the reducer case 11.

The planetary gear reducers 12A, 12B include: sun gears 21A, 21B; a plurality of planetary gears 22A, 22B which mesh with the sun gears 21; planetary carriers 23A, 23B which support the planetary gears 22A, 22B; and ring gears 24A, 24B which mesh with the outer circumference sides of the planetary gears 22A, 22B. The driving forces of the electric motors 2A, 2B are input from the sun gears 21A, 21B, and the speed reduced driving forces are output through the planetary carriers 23A, 23B.

Figure 4:
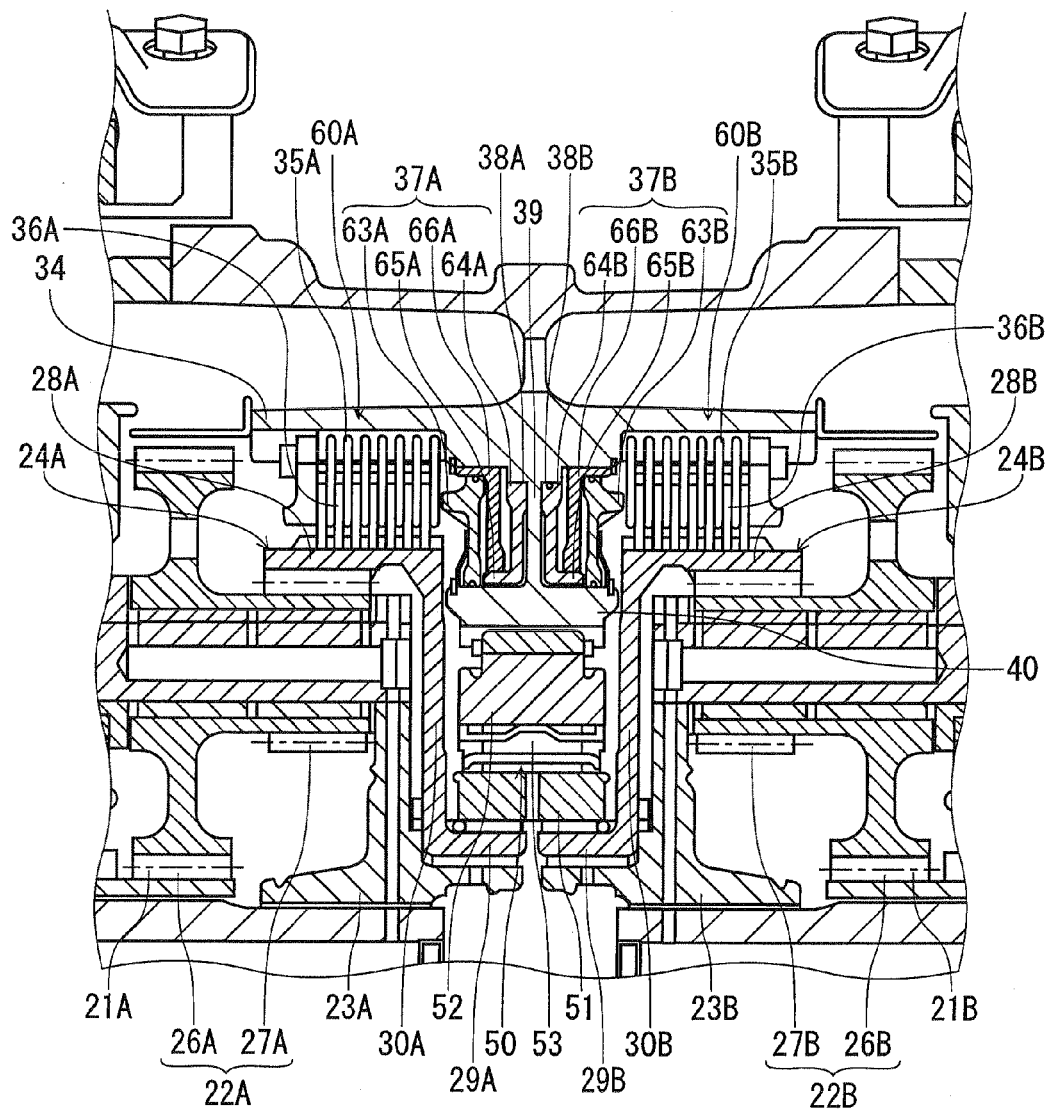
FIG. 4 is a partial enlarged view of the driving apparatus shown in FIG. 3.

The sun gears 21A, 21B are formed integrally with the cylindrical shafts 16A, 16B. As shown in FIG. 4, for example, the planetary gears 22A, 22B are double pinions having: large-diameter first pinions 26A, 26B which mesh directly with the sun gears 21A, 21B; and second pinions 27A, 27B which are smaller in diameter than the first pinions 26A, 26B, and fowled into an integral shape in a state where the first pinions 26A, 26B and the second pinions 27A, 27B are coaxial and offset in the axial direction. The planetary gears 22A, 22B are supported by the planetary carriers 23A, 23B. The axial inner end portions of the planetary carriers 23A, 23B extend toward the radially inner side, and are spline-fitted to the axles 10A, 10B so as to be integrally rotatable about the axles 10A, 10B, and the planetary carriers 23A, 23B are supported by the middle walls 18A, 18B through bearings 33A, 33B.

The middle walls 18A, 18B are configured in a bent shape so as to separate electric-motor accommodating spaces which accommodate the electric motors 2A, 2B from reducer spaces which accommodate the planetary gear reducers 12A, 12B. In the middle walls 18A, 18B, the axial interval between the middle walls 18A and 18B is broaden from the outer radial side toward the inner radial side. The bearings 33A, 33B which support the planetary carriers 23A, 23B are placed on the inner radial sides of the middle walls 18A, 18B and on the sides of the planetary gear reducers 12A, 12B, and bus rings 41A, 41B for the stators 14A, 14B are placed on the outer radial sides of the middle walls 18A, 18B, and on the sides of the electric motors 2A, 2B (see FIG. 3).

The ring gears 24A, 24B includes: gear portions 28A, 28B whose inner circumferential surfaces mesh with the second small-diameter pinions 27A, 27B; small-diameter portions 29A, 29B which are smaller in diameter than the gear portions 28A, 28B, and which are opposed to each other at a middle position of the reducer case 11; and coupling portions 30A, 30B which radially couple axial inner end portions of the gear portions 28A, 28B with axial outer end portions of the small-diameter portions 29A, 29B. In this embodiment, the maximum radii of the ring gears 24A, 24B are set so as to be smaller than the maximum distances of the first pinions 26A, 26B from the centers of the axles 10A, 10B. The small-diameter portions 29A, 29B are spline-fitted to an inner race 51 of a one-way clutch 50 (described later), and the ring gears 24A, 24B are rotated integrally with the inner race 51 of the one-way clutch 50.

Cylindrical space portions are ensured between the reducer case 11 and the ring gears 24A, 24B. In the space portions, hydraulic brakes 60A, 60B as braking means for the ring gears 24A, 24B are provided to radially overlap the first pinions 26A, 26B and axially overlap the second pinions 27A, 27B. In the hydraulic brakes 60A, 60B, a plurality of stationary plates 35A, 35B which are spline-fitted to the inner circumferential surface of a cylindrical outer-radial side supporting portion 34 that axially extends on the inner radial side of the reducer case 11, and a plurality of rotary plates 36A, 36B which are spline-fitted to the outer circumferential surfaces of the ring gears 24A, 24B are alternately provided in the axial direction, and the plates 35A, 35B, 36A, 36B are engaged and released by annular pistons 37A, 37B. The pistons 37A, 37B are flexibly accommodated in annular cylinder chambers 38A, 38B which are formed between a lateral separation wall 39 that extends to the inner radial side from the middle position of the reducer case 11, and the outer-radial side supporting portion 34 and inner-radial side supporting portion 40 that are coupled to each other by the lateral separation wall 39. The pistons 37A, 37B are advanced by introducing high-pressure oil into the cylinder chambers 38A, 38B, and retracted by discharging the oil from the cylinder chambers 38A, 38B. The hydraulic brakes 60A, 60B are connected to an oil pump 70 which, as shown in FIG. 5, are placed between the supporting portions 13a, 13b of the above-described frame member 13.

More specifically, the pistons 37A, 37B have first piston walls 63A, 63B and second piston walls 64A, 64B in the axial front and rear sides, and the piston walls 63A, 63B, 64A, 64B are coupled to each other by cylindrical inner circumferential walls 65A, 65B. Therefore, annular spaces which are opened in the radially outer side are formed between the first piston walls 63A, 63B and the second piston walls 64A, 64B. The annular spaces are partitioned into axial front and rear sides by partition members 66A, 66B which are fixed to the inner circumferential surfaces of the outer walls of the cylinder chambers 38A, 38B. In the reducer case 11, the spaces between the lateral separation wall 39 and the second piston walls 64A, 64B are formed as first operating chambers into which the high-pressure oil is to be directly introduced, and the spaces between the partition members 66A, 66B and the first piston walls 63A, 63B are formed as second operating chambers which communicate with the first operating chambers through through holes that are formed in the inner circumferential walls 65A, 65B. The spaces between the second piston walls 64A, 64B and the partition members 66A, 66B communicate with the atmosphere.

In the hydraulic brakes 60A, 60B, the high-pressure oil (operating oil) is introduced into the first operating chamber and the second operating chamber, and the stationary plates 35A, 35B and the rotary plates 36A, 36B can be pressed against each other by the pressure of the operating oil which acts on the first piston walls 63A, 63B and the second piston walls 64A, 64B. Therefore, large pressure receiving areas can be attained by the first and second piston walls 63A, 63B, 64A, 64B in the axial front and rear sides, so that large pressing forces against the stationary plates 35A, 35B and the rotary plates 36A, 36B can be obtained while suppressing the radial areas of the pistons 37A, 37B.

In the hydraulic brakes 60A, 60B, the stationary plates 35A, 35B are supported by the outer-radial side supporting portion 34 which extends from the reducer case 11, and the rotary plates 36A, 36B are supported by the ring gears 24A, 24B. When the both plates 35A, 35B, 36A, 36B are pressed by the pistons 37A, 37B, therefore, a braking force acts on the ring gears 24A, 24B by frictional engagement between the both plates 35A, 35B, 36A, 36B. When the engagement by the pistons 37A, 37B is released in this state, free rotations of the ring gears 24A, 24B are allowed.

Also between the coupling portions 30A, 30B of the ring gears 24A, 24B which are axially opposed to each other, a space portion is ensured. In the space portion, the one-way clutch 50 which transmits only the power in one direction to the ring gears 24A, 24B, and which interrupts power in other directions is provided. In the one-way clutch 50, many sprags are interposed between the inner race 51 and an outer race 52, and the clutch is configured so that the inner race 51 is caused by spline fitting to rotate integrally with the small-diameter portions 29A, 29B of the ring gears 24A, 24B. The outer race 52 is positioned and locked against rotation by the inner-radial side supporting portion 40. The one-way clutch 50 is configured so that, when the vehicle is to forward run, engagement is established and the rotations of the ring gears 24A, 24B are locked. More specifically, the one-way clutch 50 is configured so that the ring gears 24A, 24B are locked are separated depending on the acting direction of the torque acting on the ring gears 24A, 24B. Assume that the rotation direction of the ring gears 24A, 24B when the vehicle forward runs is the normal direction, the rotations of the ring gears 24A, 24B are locked in the case where a torque in the reverse direction acts on the ring gears 24A, 24B.

Next, a hydraulic circuit serving as a hydraulic controller for the driving apparatus 1 will be described with reference to FIGS. 6 and 7.

The hydraulic circuit 71 is configured so that the operating oil discharged from the electric oil pump 70 can be supplied to the first operating chambers of the hydraulic brakes 60A, 60B through a regulator valve 73 and a brake control valve 74. The electric oil pump 70 is operated in two modes or a high-pressure mode and a low-pressure mode by an electric motor 80 configured by a position sensorless brushless DC motor.

The brake control valve 74 is connected to a pump oil passage 72 which connects the electric oil pump 70 to the brake control valve 74, and a brake oil passage 75 which is connected to the hydraulic brakes 60A, 60B, and configured so as to communicate/interrupt the pump oil passage 72 and the brake oil passage 75. In the state where the pump oil passage 72 and the brake oil passage 75 communicate with each other, the operating oil in the pump oil passage 72 is supplied to the hydraulic brakes 60A, 60B to cause the brakes to be engaged, and, in the case where the pump oil passage 72 and the brake oil passage 75 are interrupted, the brake oil passage 75 is connected to a drain port 74b, and oil is discharged from the hydraulic brakes 60A, 60B to cause the hydraulic brakes 60A, 60B to be released.

The regulator valve 73 is connected to the pump oil passage 72. The regulator valve 73 includes a spool 73a serving as a switching mechanism 73f to connect/interrupt between the pump oil passage 72 and a supply port 73b. The spool 73a is urged by a spring 73c in a direction (in FIG. 6, the leftward direction, hereinafter referred to the non-supply direction) in which connection between the pump oil passage 72 and the supply port 73b are interrupted, pressed in a direction (in FIG. 6, the rightward direction, hereinafter referred to the supply direction) in which the pump oil passage 72 and the supply port 73b are communicated with each other, by the oil pressure of the pump oil passage 72 which is input to an oil chamber 73d at the left end in the figure, and further pressed in the non-supply direction by the oil pressure which is input to an oil chamber 73e at the right end in the figure.

The right-end oil chamber 73e of the regulator valve 73 is connectable to the pump oil passage 72 through a pilot oil passage 76 and a switching control valve 77. The switching control valve 77 is configured by an electromagnetic three-way valve which is controlled by the ECU 45 (hydraulic controller 48). When a solenoid 77a of the switching control valve 77 is energized by the ECU 45, the pump oil passage 72 is connected to the pilot oil passage 76 to input the oil pressure of the pump oil passage 72 to the oil chamber 73e. When the solenoid 77a is deenergized by the ECU 45, the switching control valve 77 interrupts the connection between the pump oil passage 72 and the pilot oil passage 76, connects the pilot oil passage 76 to a drain port 77b, thereby opening the oil chamber 73e to the atmosphere.

The pilot oil passage 76 is connected to the oil chamber 73e and also to the brake control valve 74. When the solenoid 77a of the switching control valve 77 is energized by the ECU 45, the switching control valve 77 connects the pump oil passage 72 to the pilot oil passage 76 to open the brake control valve 74, thereby communicating the pump oil passage 72 with the brake oil passage 75. When the solenoid 77a is deenergized by the ECU 45, the switching control valve 77 breaks the connection between the pump oil passage 72 and the pilot oil passage 76 to close the brake control valve 74, thereby disconnecting the pump oil passage 72 from the brake oil passage 75.

A low-pressure passage 78 is connected to the supply port 73b of the regulator valve 73. Oil flowing through the low-pressure passage 78 is supplied to various portions of the driving apparatus 1 such as the electric motors 2A, 2B, the planetary gear reducers 12A, 12B, and the bearings through a plurality of branch passages (not shown), to be used as cooling oil or lubricating oil.

A relief valve 79b which, when the line pressure reaches a predetermined pressure, releases the oil pressure is connected to the pump oil passage 72.

Figure 2:
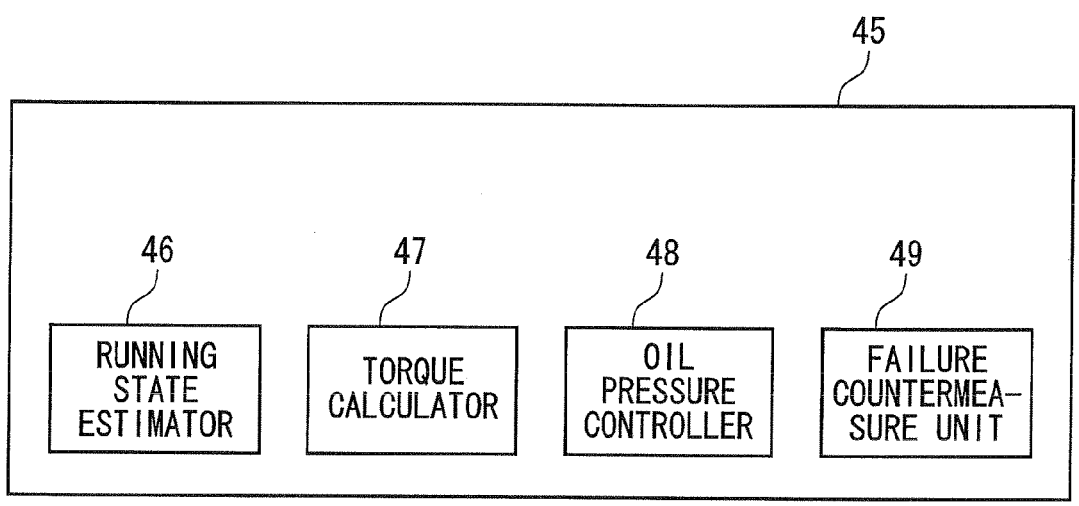
FIG. 2 is a block diagram of an ECU.

Here, the ECU 45 is a controller which performs various controls on the whole vehicle, and, as shown in FIG. 2, includes: a running state estimator 46 which estimates the running state of the vehicle from the vehicle speed, the steering angle, the accelerator pedal opening degree AP, and the like; a torque calculator 47 which calculates torques of the two electric motors 2A, 2B; an oil pressure controller 48 which controls the hydraulic brakes 60A, 60B from the running state of the vehicle estimated by the running state estimator 46; and a failure countermeasure unit 49 which, when the electric motors 2A, 2B or a high-voltage control section (inverters, boosters, and like which are not shown) that controls the electric motors 2A, 2B fails, changes the set oil pressure of the regulator valve 73 to a low oil pressure PL to release the hydraulic brakes 60A, 60B. The vehicle speed, the steering angle, the accelerator pedal opening degree AP, the shift position, the SOC, and the like are input to the ECU 45, and signals for controlling the internal combustion engine 4, those for controlling the electric motors 2A, 2B, those indicating the power generating state, charging state, discharging state, and like in the batteries 9, control signals supplied to a solenoid 74a of the brake control valve 74, and the solenoid 77a of the switching control valve 77, and the like are output from the ECU 45.

Next, the operation of the hydraulic circuit 71 of the driving apparatus 1 will be described.

Figure 6:
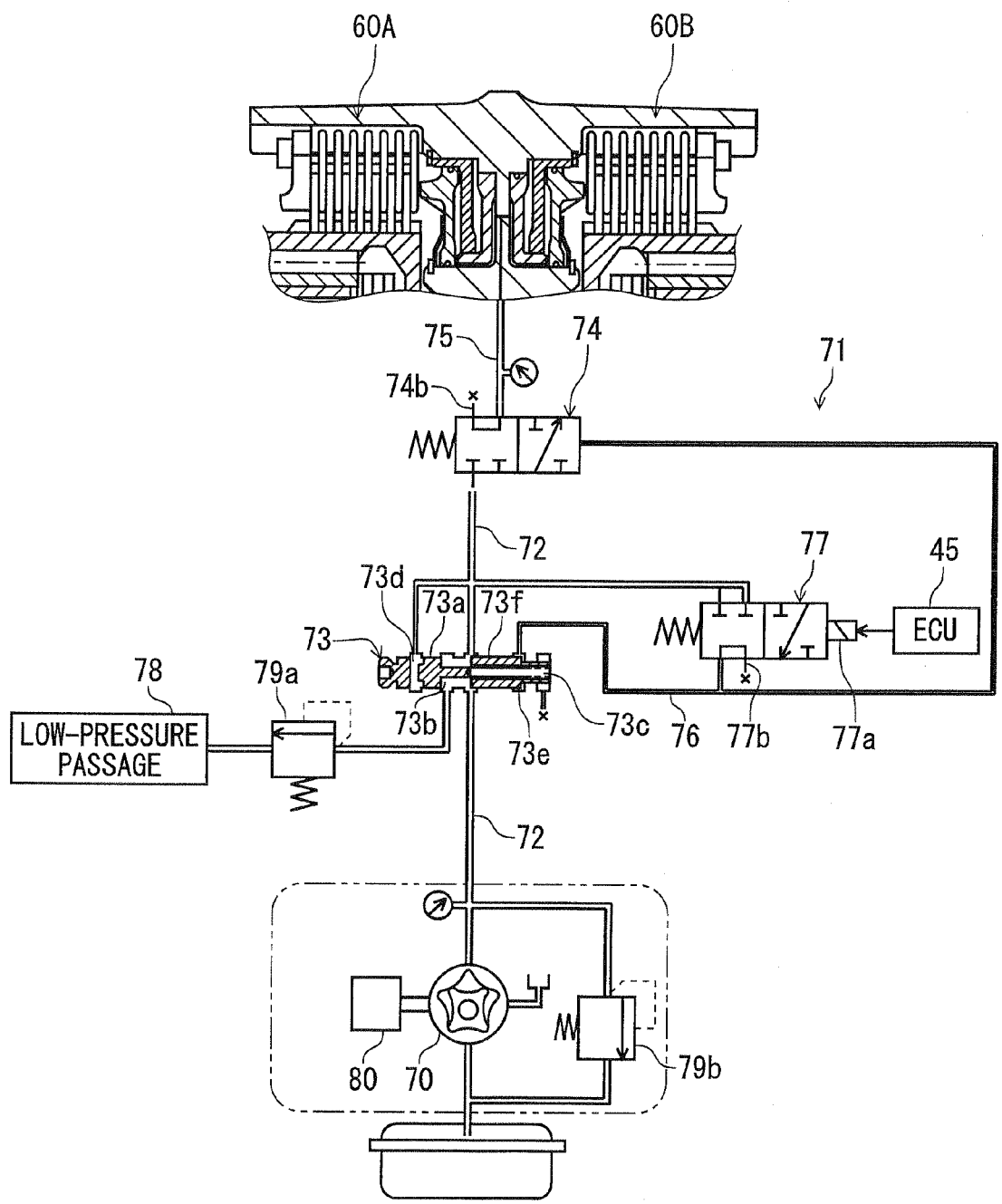
FIG. 6 is a hydraulic circuit diagram of a hydraulic controller in a state where hydraulic brakes are released.

FIG. 6 shows a state of the hydraulic circuit 71 in a state where the hydraulic brakes 60A, 60B are released. At this time, the electric oil pump 70 is operated in the low-pressure mode, and the ECU 45 deenergizes the solenoid 77a of the switching control valve 77, interrupts the connection between the pump oil passage 72 and the pilot oil passage 76, and connects the pilot oil passage 76 to the drain port 77b. At this time, the pump oil passage 72 communicates with the supply port 73b, and the brake oil passage 75 is connected to the drain port 74b, thereby interrupting the pump oil passage 72 and the brake oil passage 75.

In the regulator valve 73 in this state, the force equilibrium expression of the oil pressure and the spring load is as follows:

$$PL \times A1 = K \times \delta \quad (1)$$

From this equation, the pressure of the hydraulic circuit when the hydraulic brakes 60A, 60B are released is represented by:

$$PL = (K \times \delta)/A1 \quad (2)$$

and the line pressure of the pump oil passage 72 is maintained to the low oil pressure PL.

In Equations (1) and (2) above,

A1: pressure receiving area (mm$^2$) of the spool 73a of the oil chamber 73d, PL: line pressure (N/mm$^2$) when the hydraulic brakes 60A, 60B are released, K: spring constant (N/mm) of the spring 73c, and δ: deflection margin (mm) of the spring 73c (the stroke margin of the spool 73a).

When the hydraulic brakes 60A, 60B are engaged in the state of FIG. 6, the oil pump 70 is switched to the high-pressure mode and operated, the ECU 45 energizes the solenoid 77a of the switching control valve 77 to connect the pump oil passage 72 to the pilot oil passage 76. Therefore, the operating oil in the pump oil passage 72 is input to the oil chamber 73e, and the pump oil passage 72 and the brake oil passage 75 are communicated with each other. At this time, the spool 73a of the regulator valve 73 is pressed in the non-supply direction, and the pump oil passage 72 and the supply port 73b are temporarily interrupted.

Figure 7:
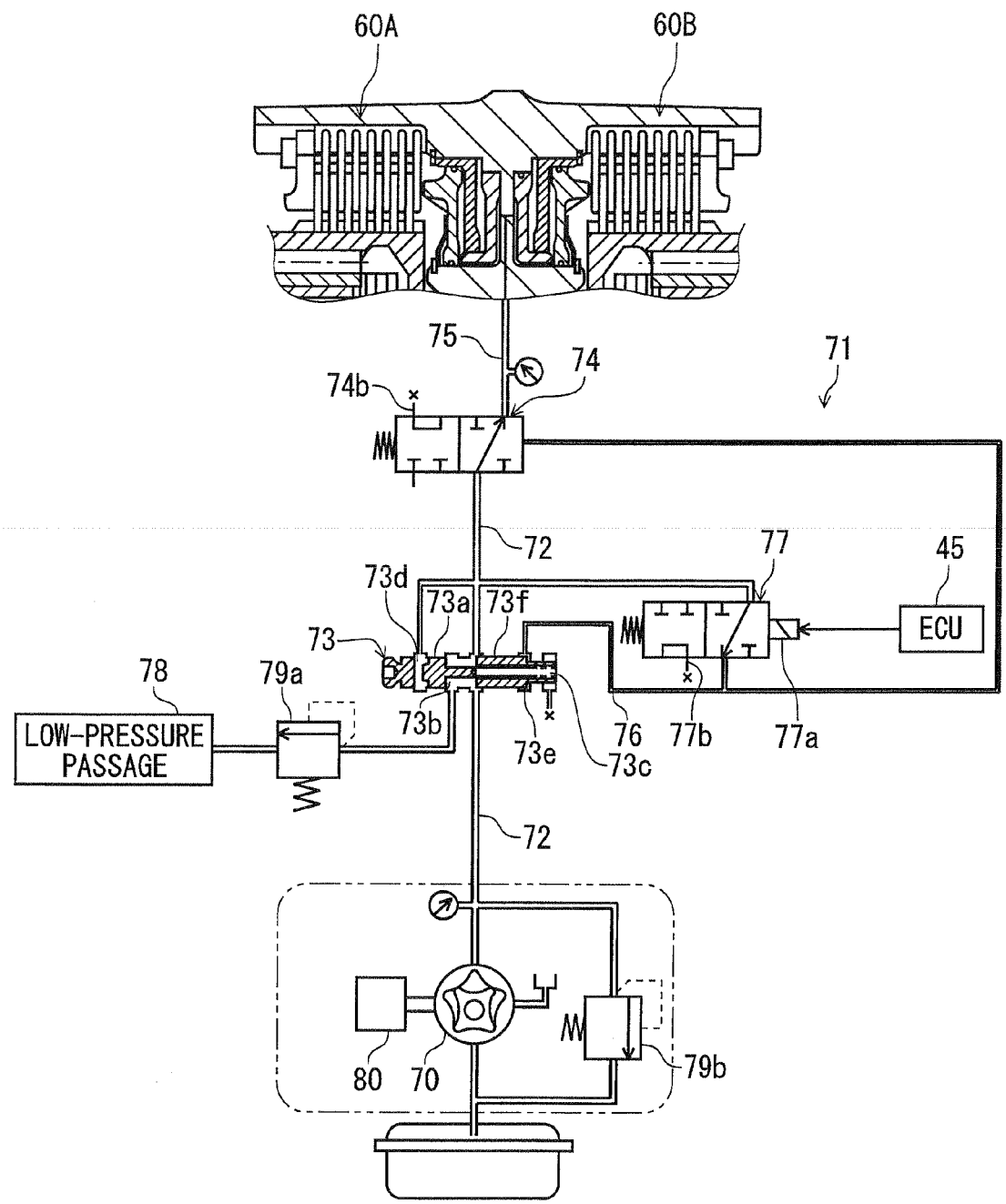
FIG. 7 is a hydraulic circuit diagram of the hydraulic controller in a state where the hydraulic brakes are engaged.

FIG. 7 shows the hydraulic circuit 71 in a state where the hydraulic brakes 60A, 60B are engaged. The pump oil passage 72 and the brake oil passage 75 are communicated with each other by energization of the solenoid 77a of the switching control valve 77 by the ECU 45. When the operating oil accumulates in the brake oil passage 75 and the first operating chambers of the hydraulic brakes 60A, 60B, the spool 73a of the regulator valve 73 which has been pressed in the non-supply direction is moved from the state where the pump oil passage 72 and the supply port 73b are temporarily interrupted, to that where the state where the pump oil passage 72 and the supply port 73b are communicated with each other.

In the regulator valve 73 in this state, the force equilibrium expression of the oil pressure and the spring load is as follows:

$$PH \times A1 = K \times \delta + PH \times A2 \quad (3)$$

From this equation, the pressure of the hydraulic circuit when the hydraulic brakes 60A, 60B are released is represented by:

$$PH = (K \times \delta)/(A1 - A2) \quad (4)$$

and the line pressure of the pump oil passage 72 is maintained to the high oil pressure PH.

As apparent from Equations (3) and (4), the high oil pressure PH is higher than the low oil pressure PL.

In Equations (3) and (4) above,

A1: pressure receiving area (mm$^2$) of the spool 73a of the oil chamber 73d, A2: pressure receiving area (mm$^2$) of the spool 73a of the oil chamber 73e, PH: line pressure (N/mm$^2$) when the hydraulic brakes 60A, 60B are engaged, K: spring constant (N/mm) of the spring 73c, and δ: deflection margin (mm) of the spring 73c (the stroke margin of the spool 73a).

In the state where the hydraulic brakes 60A, 60B are engaged, the operating oil the pressure of which is reduced by a relief valve 79a is supplied to the low-pressure passage 78, and further supplied to various portions of the driving apparatus 1 such as the electric motors 2A, 2B, the planetary gear reducers 12A, 12B, and the bearings through a plurality of branch passages (not shown), to be used as cooling oil or lubricating oil.

As described above, in the hydraulic controller in the embodiment, when the hydraulic brakes 60A, 60B are to be engaged, the ECU 45 energizes the solenoid 77a, thereby connecting the pump oil passage 72 to the pilot oil passage 76. In accordance with this, the set oil pressure of the regulator valve 73 is switched from the low oil pressure PL to the high oil pressure PH (see Equations (2) and (4) above). Since the pilot oil passage 76 is connected to the oil chamber 73e and also to the brake control valve 74, the brake control valve 74 is opened, and the pump oil passage 72 and the brake oil passage 75 are communicated with each other. Namely, when the hydraulic brakes 60A, 60B are to be engaged, the ECU 45 opens the brake control valve 74 to cause the pump oil passage 72 and the brake oil passage 75 to be communicated with each other 74, in conjunction with the switching of the set oil pressure of the regulator valve 73 from the low oil pressure PL to the high oil pressure PH.

By contrast, when the hydraulic brakes 60A, 60B are to be released, the ECU 45 deenergizes the solenoid 77a to connect the pilot oil passage 76 to the drain port 77b, thereby opening the oil chamber 73e to the atmosphere. In accordance with this, the set oil pressure of the regulator valve 73 is switched from the high oil pressure PH to the low oil pressure PL (see Equations (2) and (4) above). Since the pilot oil passage 76 is connected to the oil chamber 73e and also to the brake control valve 74, the brake control valve 74 is closed, and the connection between the pump oil passage 72 and the brake oil passage 75 is interrupted. Namely, when the hydraulic brakes 60A, 60B are to be released, the ECU 45 closes the brake control valve 74 to interrupt the connection between the pump oil passage 72 and the brake oil passage 75, in conjunction with the switching of the set oil pressure of the regulator valve 73 from the high oil pressure PH to the low oil pressure PL.

In the state where the hydraulic brakes 60A, 60B are released, the electric oil pump 70 is operated in the low-pressure mode in which the line pressure is the low oil pressure PL, and, in the state where the hydraulic brakes 60A, 60B are engaged, operated in the high-pressure mode in which the line pressure is the high oil pressure PH.

Figure 8:
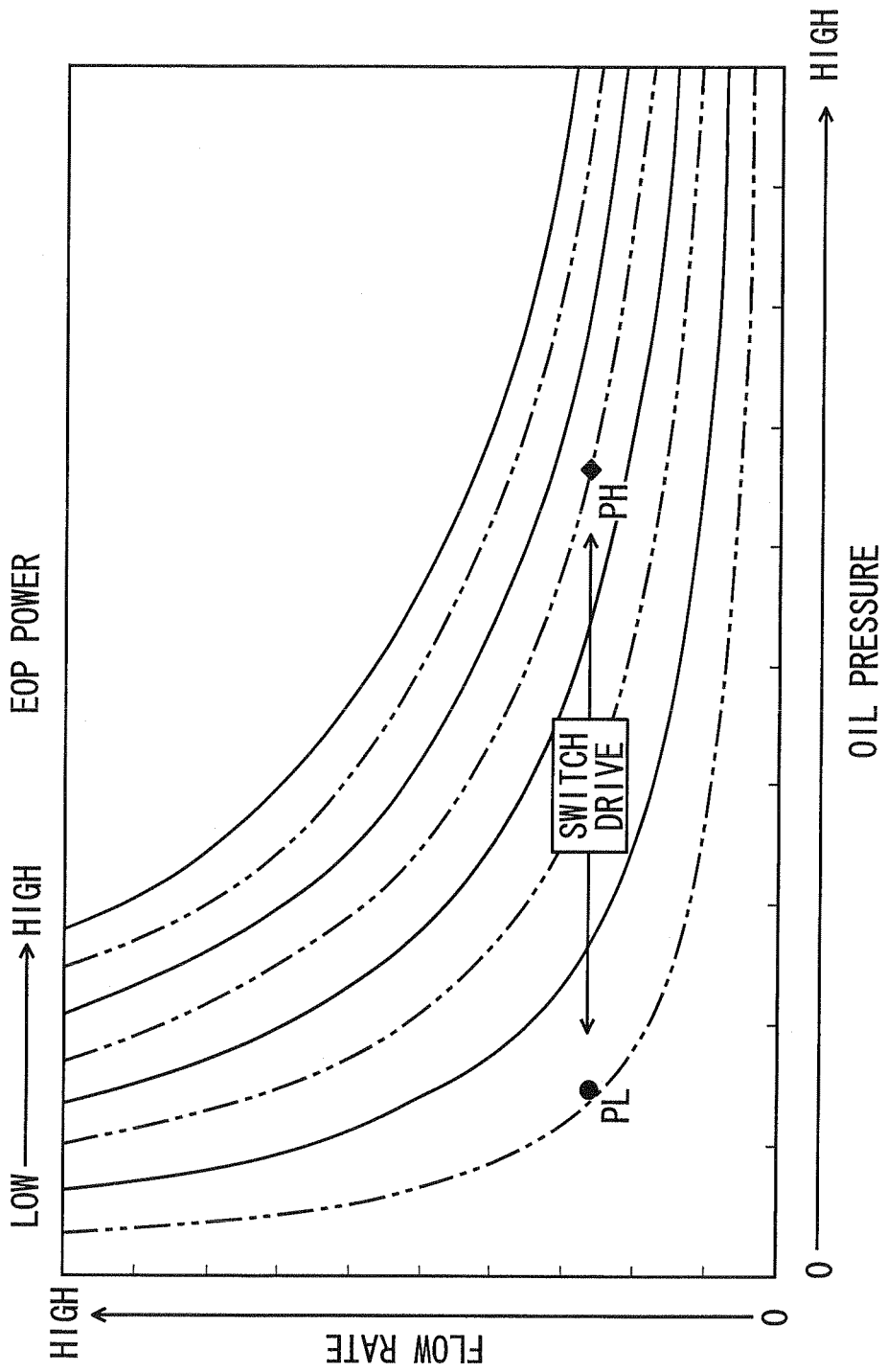
FIG. 8 is graph showing load characteristics of an electric oil pump.

FIG. 8 is graph showing load characteristics of the electric oil pump 70.

As shown in FIG. 8, in the low-pressure mode as compared to the high-pressure mode, the power of the electric oil pump 70 is reduced to about ¼ to ⅕ while maintaining the supply flow rate of the operating oil. In the low-pressure mode, namely, the load of the electric oil pump 70 is small, and the power consumption of the electric motor 80 which drives the electric oil pump 70 can be reduced as compared to the high-pressure mode.

Next, the operation of the driving apparatus 1 will be described. FIGS. 9 to 14 show collinear charts in various states. S and C in the left side indicate the sun gear 21A of the planetary gear reducer 12A coupled to the electric motor 2A, and the planetary carrier 23A coupled to the axle 10A, respectively, S and C in the right side indicate the sun gear 21B of the planetary gear reducer 12B coupled to the electric motor 2B, and the planetary carrier 23B coupled to the axle 10b, respectively, R indicates the ring gears 24A, 24B, BRK denotes the hydraulic brakes 60A, 60B, and OWC indicates the one-way clutch 50. In the following description, it is assumed that the rotation direction of the sun gears 21A, 21B when the vehicle forward runs is the normal direction. In the figures, the upper side from the state where the vehicle stops indicates the rotation in the normal direction, the lower side indicates the rotation in the reverse direction, an upward arrow indicates a torque in the normal direction, and a downward arrow indicates a torque in the reverse direction.

Figure 9:
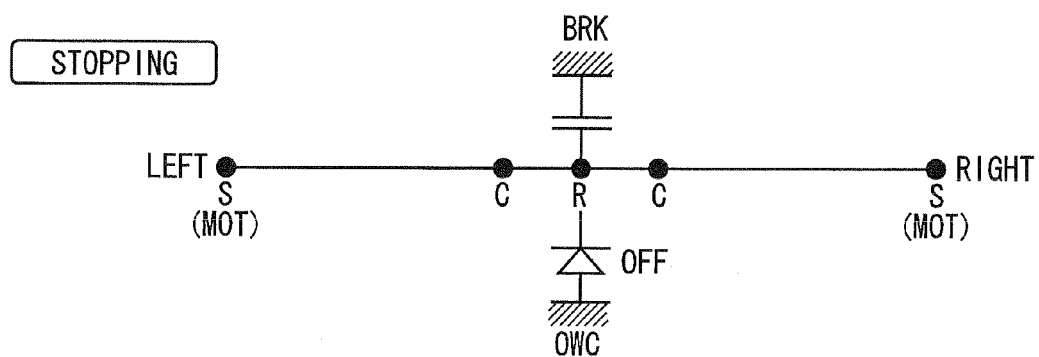
FIG. 9 is a collinear chart of the driving apparatus during stopping of the vehicle.

FIG. 9 is a collinear chart during stopping of the vehicle. At this time, the electric motors 2A, 2B are stopped, and the axles 10A, 10B are stopped. Therefore, no torque acts on all the elements.

Figure 10:
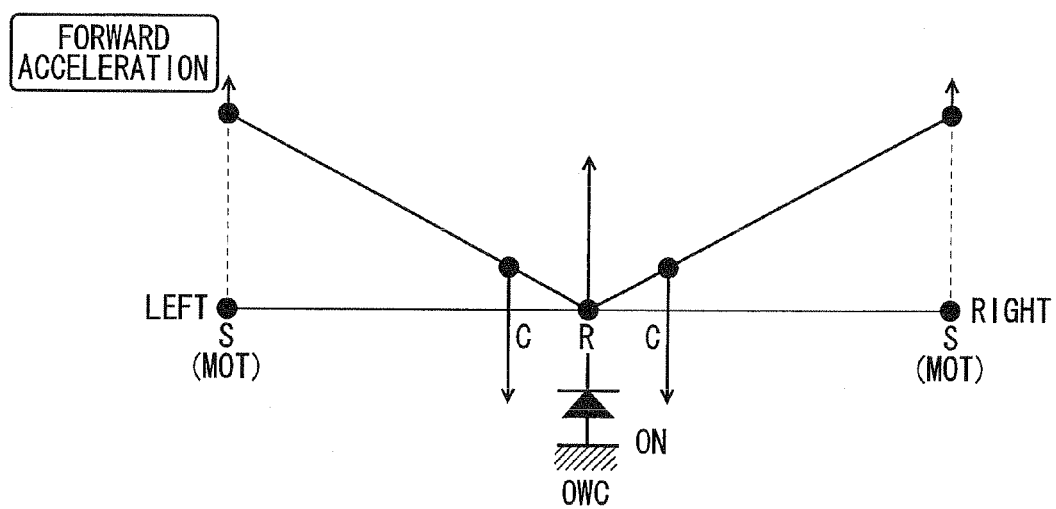
FIG. 10 is a collinear chart of the driving apparatus in the case where the driving apparatus performs forward acceleration running.

FIG. 10 is a collinear chart in the case where the vehicle is caused to forward run by the motor torques of the electric motors 2A, 2B of the driving apparatus 1, namely the vehicle forward runs while the driving apparatus 1 functions as the acceleration side. When the electric motors 2A, 2B are driven, a torque in the normal direction is applied to the sun gears 21A, 21B. At this time, as described above, the ring gears 24A, 24B are locked by the one-way clutch 50, and locking torques in the normal direction are applied to the ring gears 24A, 24B which try to rotate in the reverse direction. This causes the planetary carriers 23A, 23B to rotate in the normal direction, so that the vehicle forward runs. The running resistances from the axles 10A, 10B act on the planetary carriers 23A, 23B in the reverse direction. During running of the vehicle, when the ignition is turned ON and the torque of the electric motors 2A, 2B are increased, the one-way clutch 50 is mechanically engaged, and the ring gears 24A, 24B are locked. Therefore, the vehicle can be started to run without causing the hydraulic brakes 60A, 60B to be engaged. Therefore, the responsibility in starting of the vehicle can be improved.

Figure 11:
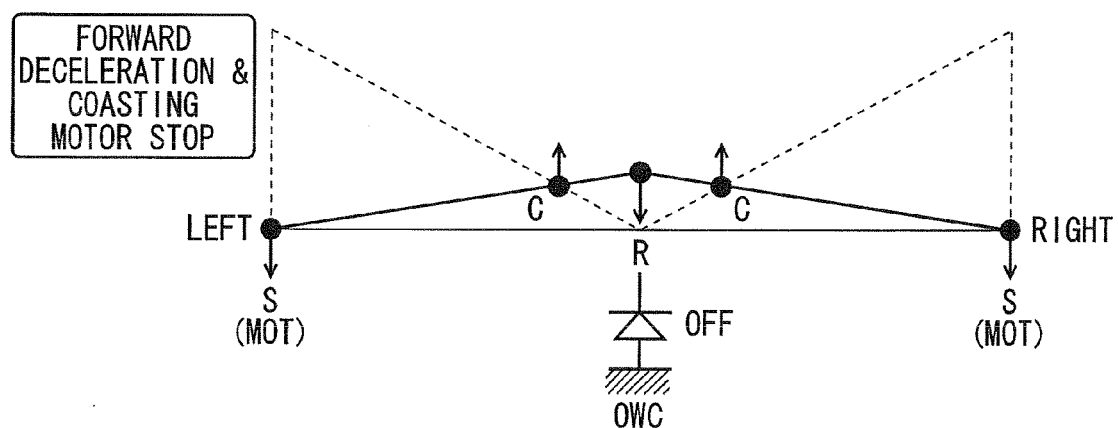
FIG. 11 is a collinear chart of the driving apparatus in the case where the driving apparatus performs forward deceleration running and electric motors stop.

FIG. 11 is a collinear chart in the case where the electric motors 2A, 2B are stopped in a state where the vehicle is caused to forward run by the driving unit 6, or towed in the forward direction by another vehicle or the like, or namely in the case where the driving apparatus 1 is decelerated or coasted (inertially moved) and the electric motors 2A, 2B are stopped. When the electric motors 2A, 2B are stopped as shown in FIG. 10, torques in the normal direction which are generated by the axles 10A, 10B, and which cause the forward running to be continued act on the planetary carriers 23A, 23B, and therefore torques in the reverse direction act on the ring gears 24A, 24B, whereby the one-way clutch 50 is released. Therefore, the ring gears 24A, 24B run idle at a speed higher than the planetary carriers 23A, 23B. In the case where the electric motors 2A, 2B are not required to perform regeneration, when the ring gears 24A, 24B are not fixed by the hydraulic brakes 60A, 60B, consequently, the electric motors 2A, 2B are stopped, and co-rotation of the electric motors 2A, 2B can be prevented from occurring. At this time, cogging torques in the normal direction act on the electric motors 2A, 2B, and the total torque component which balances with the cogging torques and frictions of the ring gears 24A, 24B becomes axle losses in the axles 10A, 10B.

Figure 12:
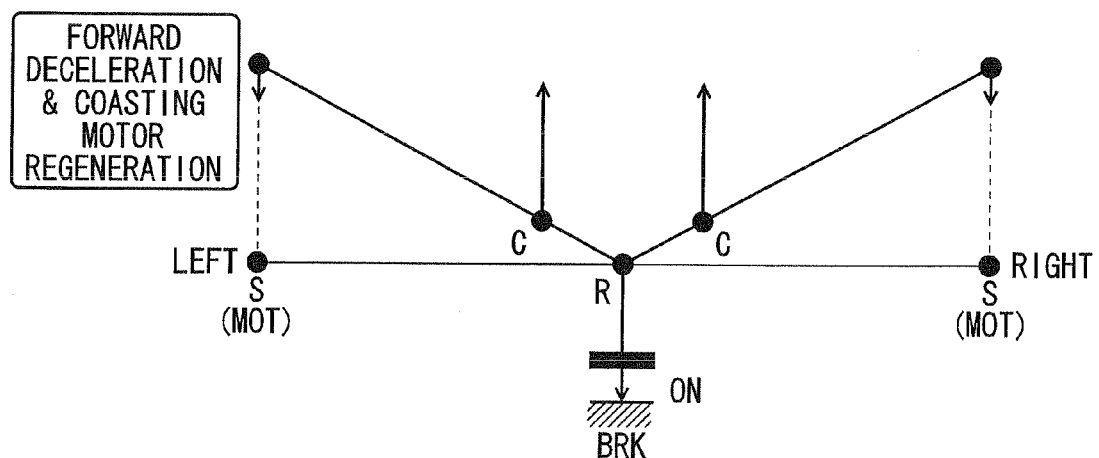
FIG. 12 is a collinear chart of the driving apparatus in the case where the driving apparatus performs forward deceleration running and electric motors regenerate.

FIG. 12 is a collinear chart in the case where the electric motors 2A, 2B perform regeneration in a state where the vehicle is caused to forward run by the driving unit 6 and the vehicle speed is naturally decelerated due to turning off of the accelerator pedal or braking deceleration due to the brakes, or namely in the case where the driving apparatus 1 is decelerated or coasted (inertially moved) and the electric motors 2A, 2B perform regeneration. When the electric motors 2A, 2B are caused to perform regeneration in the state of FIG. 10, torques in the normal direction which are generated by the axles 10A, 10B, and which cause the forward running to be continued act on the planetary carriers 23A, 23B, and therefore torques in the reverse direction act on the ring gears 24A, 24B, whereby the one-way clutch 50 is released. At this time, when the hydraulic brakes 60A, 60B are engaged to apply locking torques in the reverse direction on the ring gears 24A, 24B, the ring gears 24A, 24B are fixed, and regenerative braking torques in the reverse direction act on the electric motors 2A, 2B. Therefore, regenerative charging can be performed by the electric motors 2A, 2B.

Figure 13:
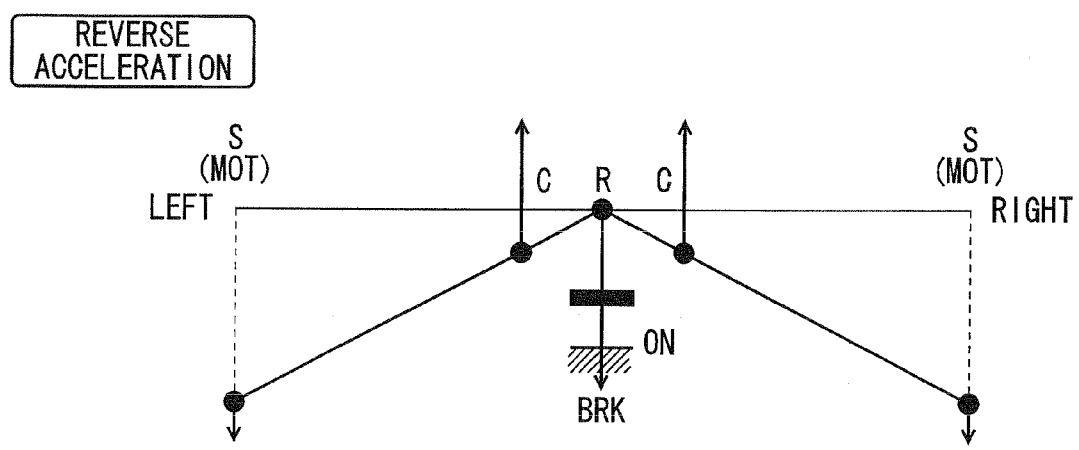
FIG. 13 is a collinear chart of the driving apparatus in the case where the driving apparatus performs reverse acceleration running.

FIG. 13 is a collinear chart in the case where the vehicle is caused to reversely run by the motor torques of the electric motors 2A, 2B of the driving apparatus 1, or namely in the case where the driving apparatus 1 performs reverse acceleration. When the electric motors 2A, 2B are driven in the reverse direction, torques in the reverse direction are applied to the sun gears 21A, 21B. At this time, torques in the normal direction act on the ring gears 24A, 24B, and the one-way clutch 50 is released. At this time, when the hydraulic brakes 60A, 60B are engaged to apply locking torques in the reverse direction on the ring gears 24A, 24B, the ring gears 24A, 24B are fixed, and the planetary carriers 23A, 23B rotate in the reverse direction to perform reverse running. The running resistances from the axles 10A, 10B act on the planetary carriers 23A, 23B in the normal direction.

Figure 14:
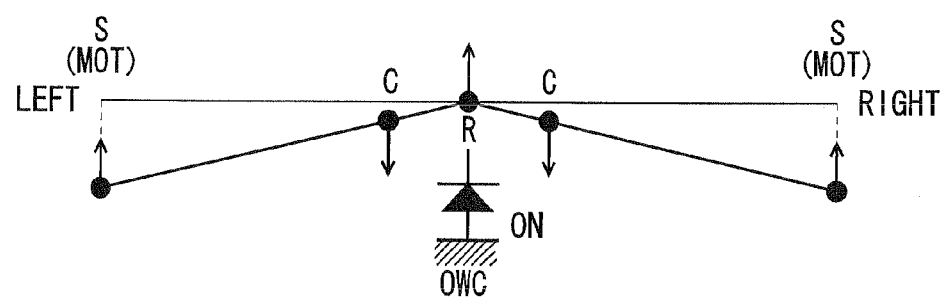
FIG. 14 is a collinear chart of the driving apparatus in the case where the driving apparatus performs reverse deceleration running.

FIG. 14 is a collinear chart in the case where the vehicle is caused to reversely run by the driving unit 6, or towed in the reverse direction by another vehicle or the like, or namely in the case where the driving apparatus 1 is driven in reverse running. At this time, the ring gears 24A, 24B are locked by the one-way clutch 50, and torques in the reverse direction which try to continue the reverse running are applied from the axles 10A, 10B to the planetary carriers 23A, 23B. Therefore, the ring gears 24A, 24B are locked by the one-way clutch 50, and locking torques in the normal direction are applied to the ring gears 24A, 24B which try to rotate in the reverse direction, and counter electromotive forces in the normal direction are generated in the electric motors 2A, 2B.

Figure 15:
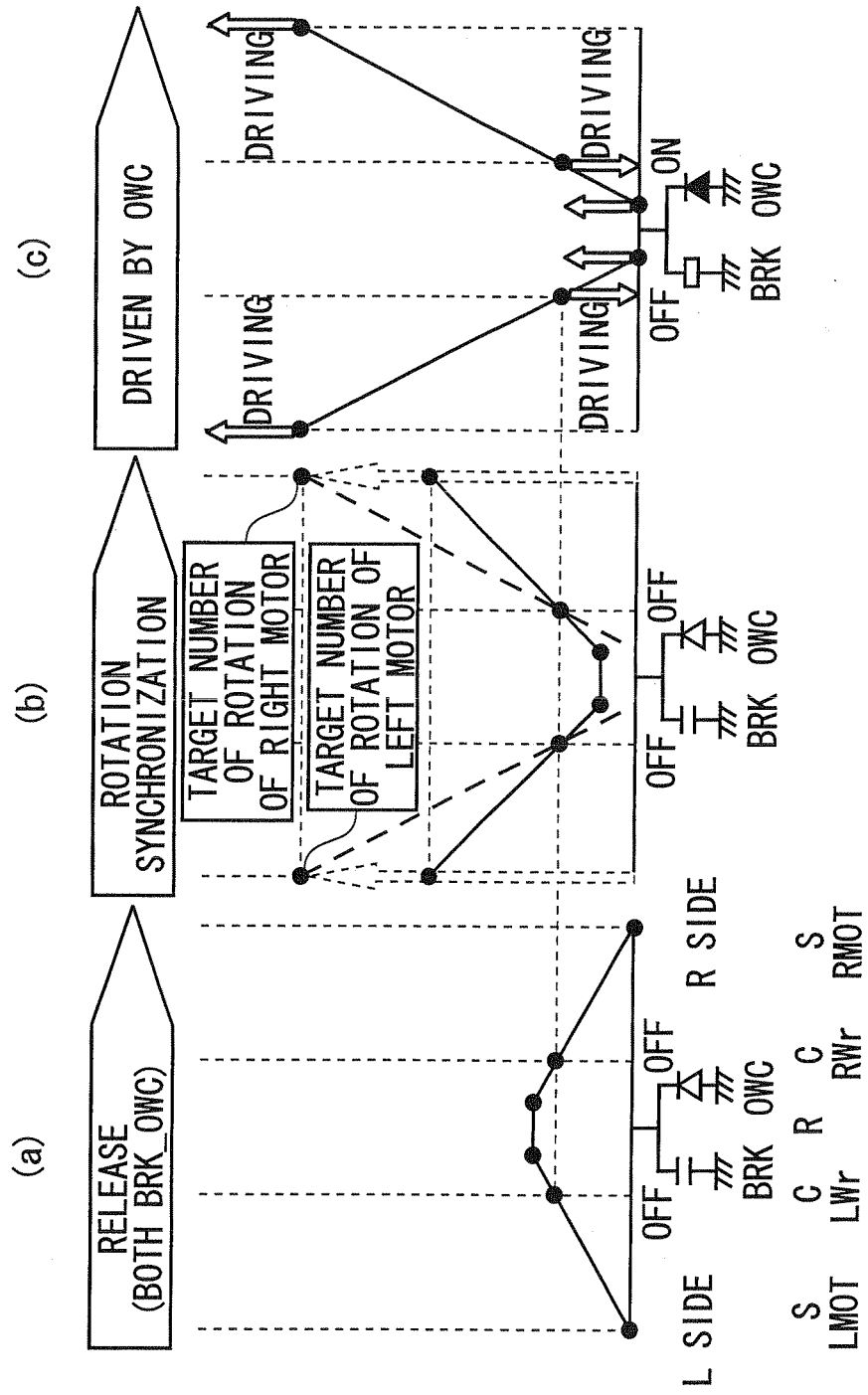
FIG. 15 shows an engagement control in which assist is performed in a state where right and left electric motors are stopped, (a) is a collinear chart during high-speed cruising by an internal combustion engine, (b) is a collinear chart in rotation synchronization, and (c) is a collinear chart in assist.
Figure 16:
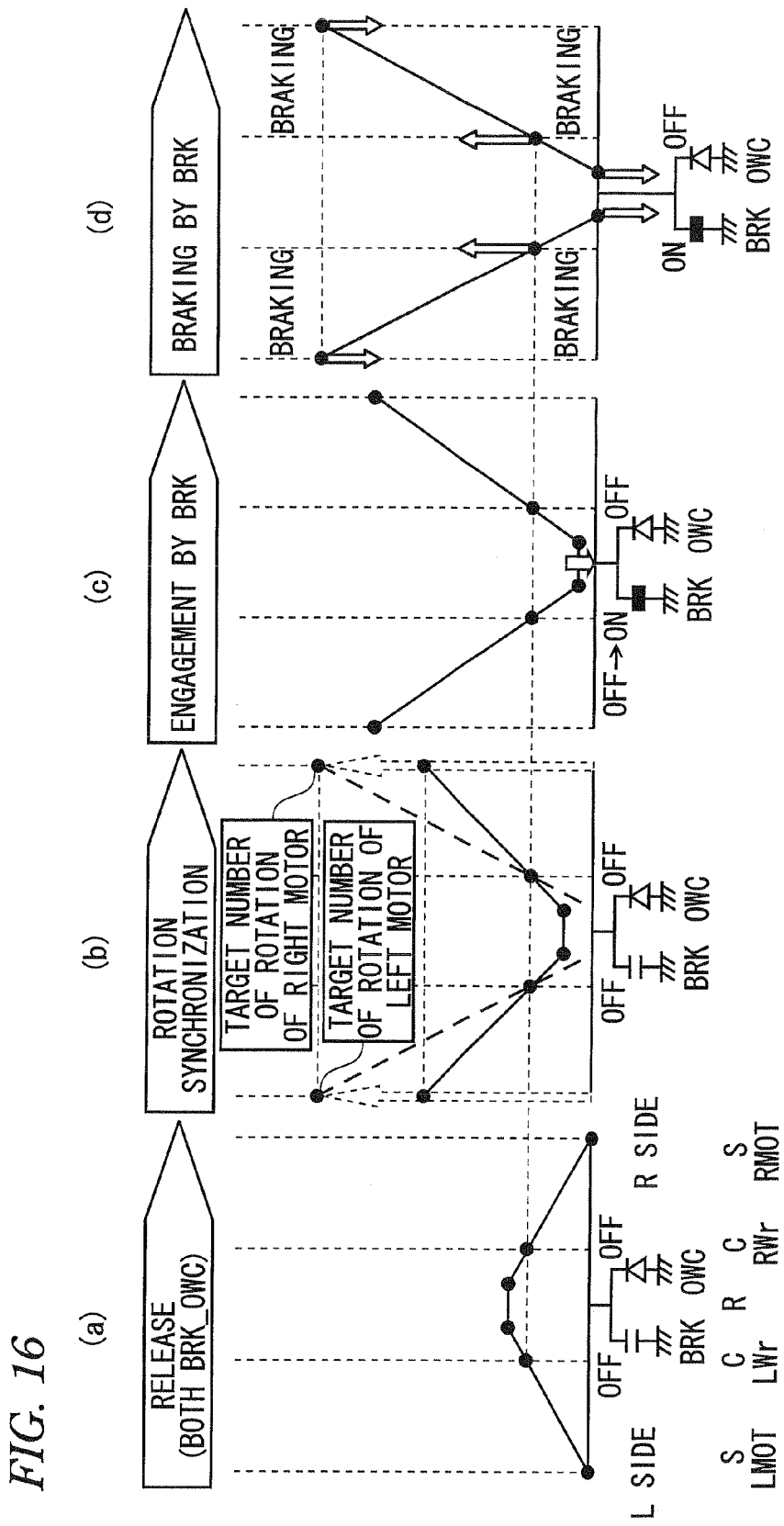
FIG. 16 shows an engagement control in which regeneration is performed in a state where the right and left electric motors are stopped, (a) is a collinear chart during high-speed cruising by an internal combustion engine, (b) is a collinear chart in rotation synchronization, (c) is a collinear chart in engagement of the hydraulic brakes, and (d) is a collinear chart in regeneration.

Next, an engagement control of the one-way clutch 50 and the hydraulic brakes 60A, 60B during running of the vehicle will be described with reference to FIGS. 15 and 16.

FIG. 15(a) is a collinear chart of the driving apparatus 1 during high speed cruising which is caused by the driving unit 6 (the state of FIG. 11). In this state, as described above, also the one-way clutch 50 and the hydraulic brakes 60A, 60B are not engaged. In the case where assist is to be performed by the electric motors 2A, 2B in this state, the target numbers of rotations of the electric motors 2A, 2B are decided in accordance with the numbers of rotations of the planetary carriers 23A, 23B, and, as shown in FIG. 15(b), assist driving torques (power driving torques) are output by the electric motors 2A, 2B in conformity to the target numbers of rotations of the electric motors 2A, 2B, whereby, as shown in FIG. 15(c), the one-way clutch 50 is engaged and assist can be performed (the state of FIG. 10).

By contrast, in the case where charging is performed by the electric motors 2A, 2B during high speed cruising which is caused by the driving unit 6 (FIG. 16(a)), the target numbers of rotations of the electric motors 2A, 2B are first decided in accordance with the numbers of rotations of the planetary carriers 23A, 23B, the numbers of rotations of the electric motors 2A, 2B are made coincident with the target numbers of rotations as shown in FIG. 16(b), and, when the numbers of rotations become substantially equal to each other as shown in FIG. 16(c), the hydraulic brakes 60A, 60B are engaged, and the electric motors 2A, 2B output regenerative braking torques (regenerative torques), whereby, as shown in FIG. 16(d), the electric motors 2A, 2B are allowed to perform charging (the state of FIG. 12).

FIG. 17 is a view showing the states of the electric motors 2A, 2B and a decoupling mechanism (hereinafter, the one-way clutch 50 and the hydraulic brakes 60A, 60B are generally referred to as the decoupling mechanism), and the line pressure of the hydraulic circuit 71 in the running state of the vehicle. In the figure, "Front" means the driving unit 6 which drives the front wheels Wf, "Rear" means the driving apparatus 1 which drives the rear wheels Wr, "○" indicates an operation (including driving and regeneration), and "x" indicates a non-operation (stop). Moreover, MOT state means the state of the electric motors 2A, 2B of the driving apparatus 1, "OWC" means the one-way clutch 50, and "Brake" means the hydraulic brakes 60A, 60B.

During stopping, the electric motors 2A, 2B of the driving apparatus 1 are stopped, both the driving unit 6 on the side of the front wheels Wf and the driving apparatus 1 on the side of the rear wheels Wr are stopped, and, as described with reference to FIG. 9, also the decoupling mechanism is in the no-operation state. At this time, the line pressure is adjusted by the low oil pressure PL (see FIG. 6).

After the ignition is turned ON, during EV starting, the electric motors 2A, 2B of the driving apparatus 1 for the rear wheels Wr are driven. At this time, as described with reference to FIG. 10, the decoupling mechanism is locked by the one-way clutch 50, and the powers of the electric motors 2A, 2B are transmitted to the axles 10A, 10B. At this time, the line pressure is adjusted by the low oil pressure PL.

During acceleration, then, four-wheel driving is performed by the driving unit 6 on the side of the front wheels Wf and the driving apparatus 1 on the side of the rear wheels Wr. Also at this time, as described with reference to FIG. 10, the decoupling mechanism is locked by the one-way clutch 50, and the powers of the electric motors 2A, 2B are transmitted to the axles 10A, 10B. Also at this time, the line pressure is adjusted by the low oil pressure PL.

In EV cruising in low- and middle-speed ranges, the motor efficiency is high, and therefore the driving unit 6 on the side of the front wheels Wf is in the no-operation state, and rear wheel driving is performed by the driving apparatus 1 on the side of the rear wheels Wr. Also at this time, as described with reference to FIG. 10, the decoupling mechanism is locked by the one-way clutch 50, and the powers of the electric motors 2A, 2B are transmitted to the axles 10A, 10B. Also at this time, the line pressure is adjusted by the low oil pressure PL.

By contrast, in high-speed cruising in a high-speed range, the motor efficiency is high, and therefore front wheel driving is performed by the driving unit 6 on the side of the front wheels Wf. At this time, as described with reference to FIG. 11, the one-way clutch 50 of the decoupling mechanism is decoupled (OWC free), and the hydraulic brakes 60A, 60B are not operated. Therefore, the electric motors 2A, 2B are stopped. Also at this time, the line pressure is adjusted by the low oil pressure PL.

Also in the case of natural deceleration, as described with reference to FIG. 11, the one-way clutch 50 of the decoupling mechanism is decoupled (OWC free), and the hydraulic brakes 60A, 60B are not operated. Therefore, the electric motors 2A, 2B are stopped. Also at this time, the line pressure is adjusted by the low oil pressure PL.

By contrast, when deceleration regeneration is to be performed, for example, when driving is to be performed by the driving force of the driving unit 6 on the side of the front wheels Wf, as described with reference to FIG. 12, the one-way clutch 50 of the decoupling mechanism is decoupled (OWC free), but the hydraulic brakes 60A, 60B are engaged, thereby enabling the electric motors 2A, 2B to perform regenerative charging. At this time, the line pressure is adjusted by the high oil pressure PH (see FIG. 7).

In normal running, in cooperation with the vehicle brake braking control, the electric motors 2A, 2B perform regeneration to recover the running energy. In the case of emergency braking (an ABS is operated), however, regeneration of the electric motors 2A, 2B is inhibited and priority is given to vehicle braking is requested. In this case, the one-way clutch 50 is in a decoupled state (OWC free), and the hydraulic brakes 60A, 60B are not operated, thereby causing the electric motors 2A, 2B to be stopped. At this time, the line pressure is adjusted by the low oil pressure PL.

In the case of reverse running, the driving unit 6 on the side of the front wheels Wf is stopped, and the driving apparatus 1 on the side of the rear wheels Wr is driven so that rear wheel driving is performed, or four-wheel driving is performed by the driving unit 6 on the side of the front wheels Wf and the driving apparatus 1 on the side of the rear wheels Wr. At this time, as described with reference to FIG. 13, the electric motors 2A, 2B rotate in the reverse direction, the one-way clutch 50 of the decoupling mechanism is decoupled (OWC free), but the hydraulic brakes 60A, 60B are engaged, whereby the powers of the electric motors 2A, 2B are transmitted to the axles 10A, 10B. At this time, the line pressure is adjusted by the high oil pressure PH.

In the case where the vehicle is towed to the forward direction side (FWD towed), as described with reference to FIG. 11, the one-way clutch 50 of the decoupling mechanism is decoupled (OWC free), the hydraulic brakes 60A, 60B are not operated, and therefore the electric motors 2A, 2B are stopped. In the case of FWD towed, when the electric motors 2A, 2B is to perform regeneration, the hydraulic brakes 60A, 60B are connected in a similar manner as deceleration regeneration. At this time, the line pressure is adjusted by the low oil pressure PL.

In the case where the electric motors 2A, 2B cannot be driven because of a failure of a high-voltage system such as a failure of the PDU or the like, the failure countermeasure unit 49 deenergizes the solenoid 74a of the brake control valve 74, and also the solenoid 77a of the switching control valve 77, whereby the electric motors 2A, 2B are released. Then, front wheel driving is performed by the driving unit 6 on the side of the front wheels Wf, whereby, as described with reference to FIG. 11, the one-way clutch 50 is decoupled (OWC free). At this time, since also the hydraulic brakes 60A, 60B are released, the electric motors 2A, 2B are stopped, and the line pressure is adjusted by the low oil pressure PL.

Figure 18:
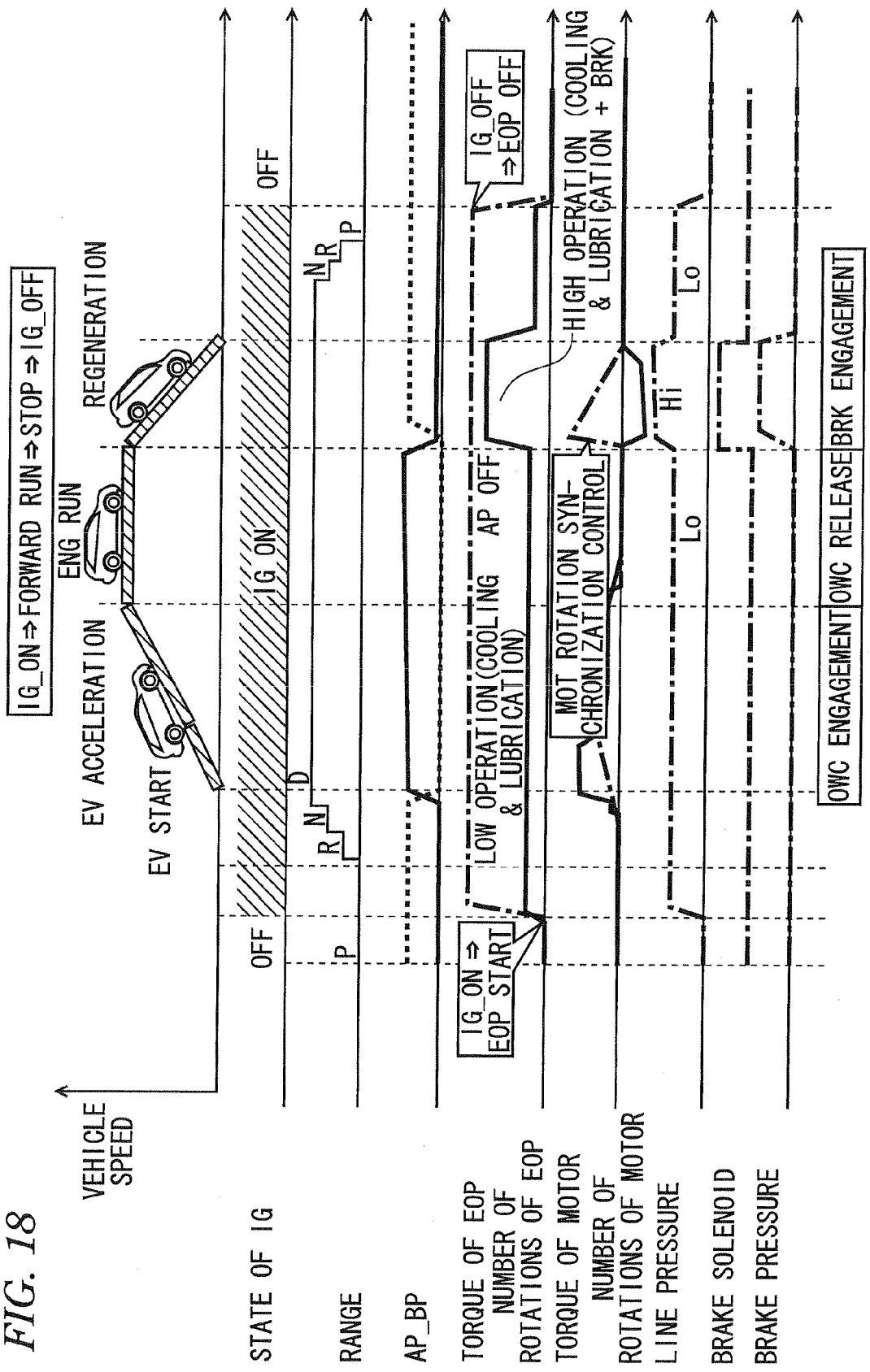
FIG. 18 is a timing chart in forward running of the vehicle.

FIG. 18 is a timing chart of the driving apparatus 1 and the hydraulic circuit 71 in the case where the vehicle straightly runs in the forward direction.

When the ignition is first turned ON, the electric motors 2A, 2B are driven, and the electric oil pump 70 (EOP) is operated. At this time, the one-way clutch 50 and the hydraulic brakes 60A, 60B are released, and the line pressure is set to the low oil pressure PL (the state of FIG. 9). In this state, when the driver sets the shift range to Drive (D), and then presses the accelerator pedal, the one-way clutch 50 is engaged while the hydraulic brakes 60A, 60B are maintained to be released, and EV starting/acceleration in which the motor torques are transmitted to the axles 10A, 10B is performed (the state of FIG. 10). When the vehicle reaches the high-speed region, high-speed cruising is performed by the driving unit 6. During this period, the electric motors 2A, 2B are stopped, the hydraulic brakes 60A, 60B and the one-way clutch 50 are released, and the line pressure remains to be set to the low oil pressure PL (the state of FIG. 11). When the driver then presses the brake pedal during high-speed cruise running to stop the vehicle, as shown in FIGS. 16(b) and (c), a rotation synchronizing control for the electric motors 2A, 2B is performed, and the hydraulic brakes 60A, 60B are engaged. At this time, the line pressure is set to the high oil pressure PH (the state of FIG. 12). When the vehicle is then stopped, the hydraulic brakes 60A, 60B are released, and the line pressure is switched to the low oil pressure PL. When the ignition is then turned OFF, the electric motors 2A, 2B are stopped.

Figure 19:
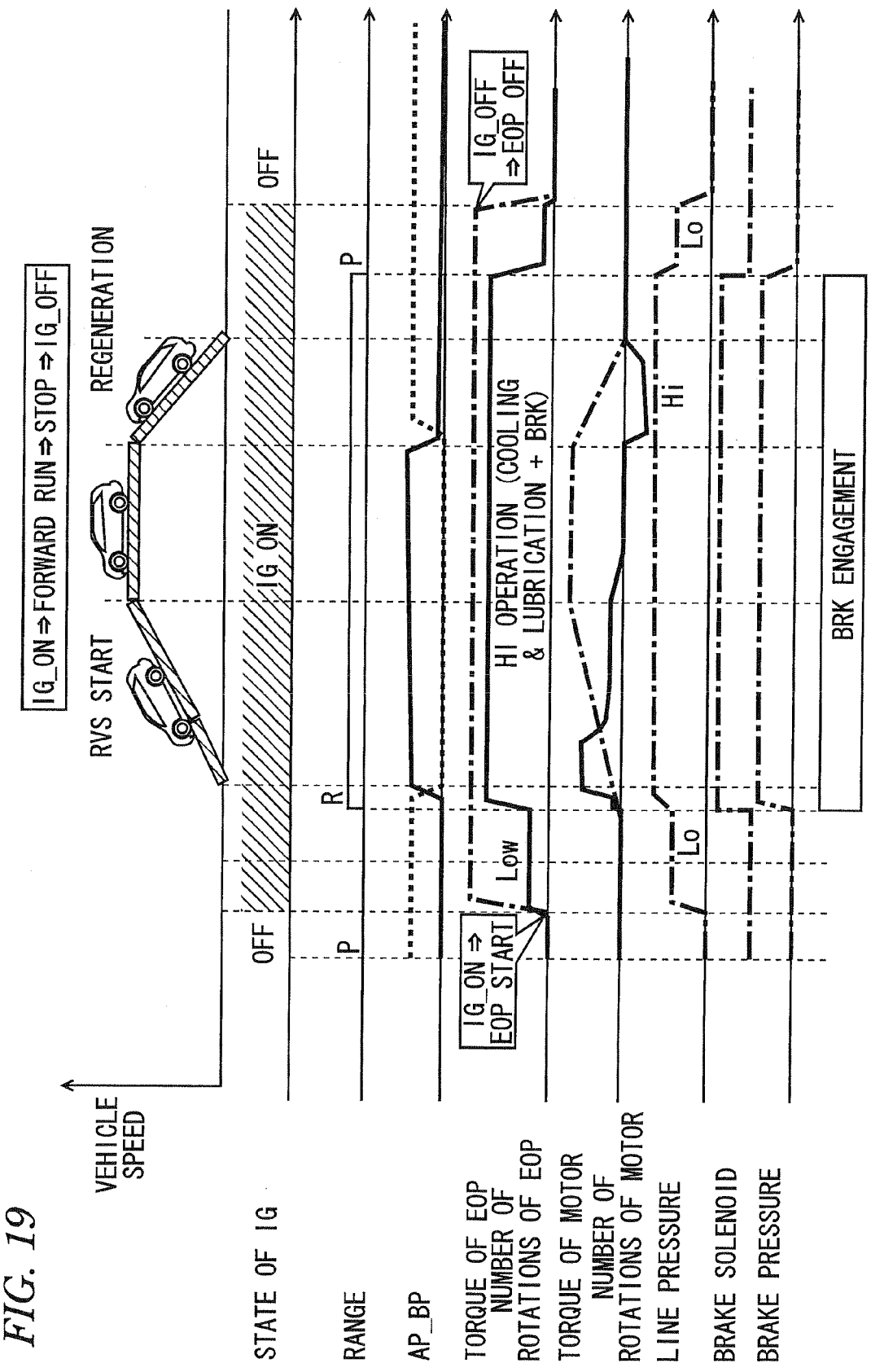
FIG. 19 is a timing chart in reverse running of the vehicle.

FIG. 19 is a timing chart of the driving apparatus 1 and the hydraulic circuit 71 in the case where the vehicle straightly runs in the reverse direction.

When the ignition is first turned ON, the electric motors 2A, 2B are driven, and the electric oil pump 70 (EOP) is operated. At this time, the one-way clutch 50 and the hydraulic brakes 60A, 60B are released, and the line pressure is set to the low oil pressure PL (the state of FIG. 9). In this state, when the driver changes the shift range to Reverse (R), the hydraulic brakes 60A, 60B are engaged. When the driver presses the accelerator pedal, the motor torques are transmitted to the axles 10A, 10B, and reverse starting/acceleration is performed (the state of FIG. 13). At this time, the line pressure is set to the high oil pressure PH. When the driver presses the brake pedal during high-speed cruise running to stop the vehicle, the hydraulic brakes 60A, 60B and the one-way clutch 50 are engaged. At this time, since also the hydraulic brakes 60A, 60B are engaged, the line pressure remains to be set to the high oil pressure PH (the state of FIG. 14). When the vehicle is stopped and the shift range is set to Parking (P), the hydraulic brakes 60A, 60B are released, and the line pressure is switched to the low oil pressure PL. When the ignition is then turned OFF, the electric motors 2A, 2B are stopped.

Figure 20:
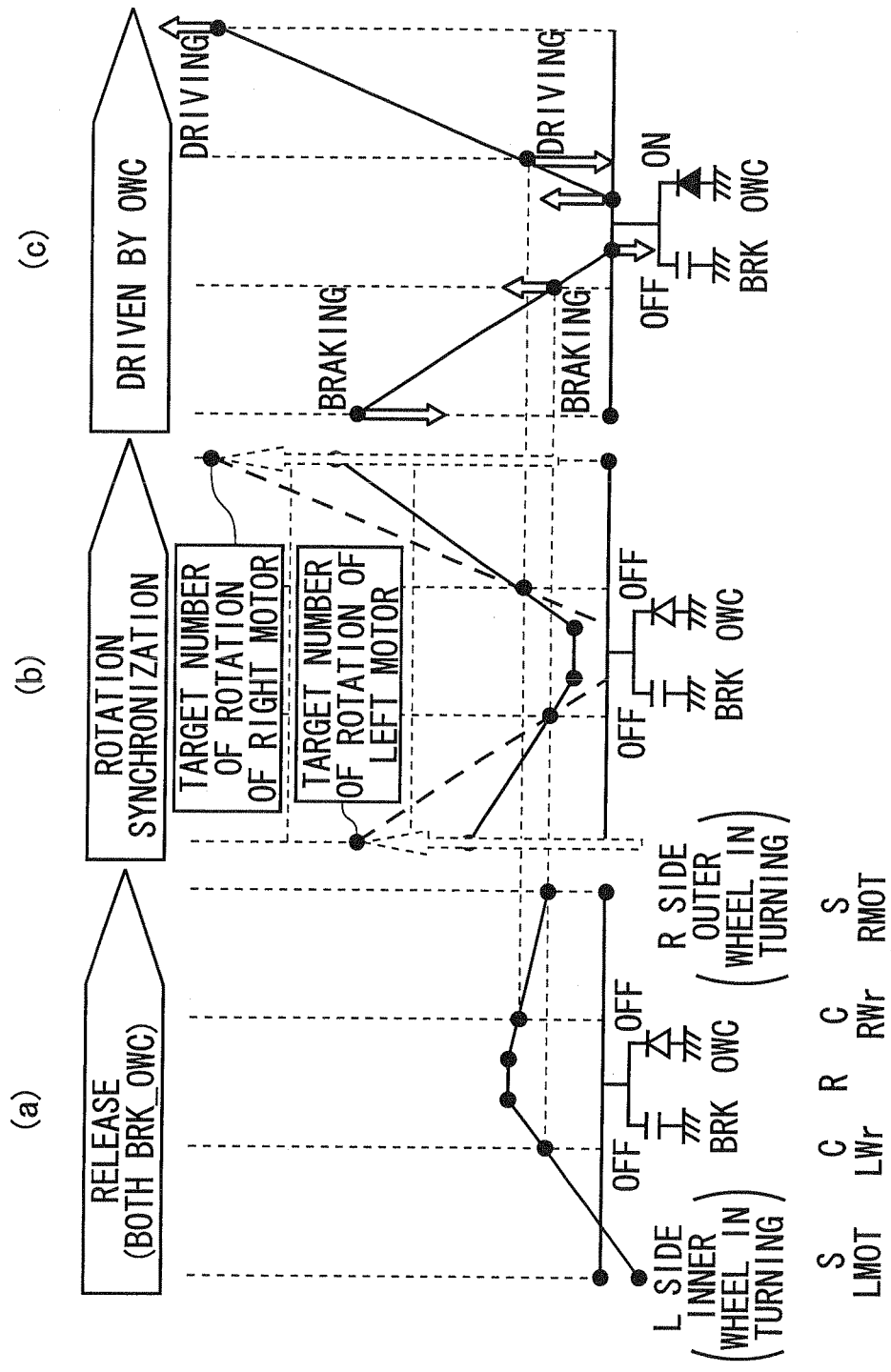
FIG. 20 shows an engagement control in which assist/regeneration is performed in a state where a rotational difference between the right and left electric motors is caused by turning of the vehicle, (a) is a collinear chart during turning, (b) is a collinear chart in rotation synchronization, and (c) is a collinear chart in assist/regeneration.

In the above, the case where, when the vehicle straightly runs, there is no rotational difference between the left and right electric motors 2A, 2B has been described. Subsequently, with reference to FIGS. 20 and 21, an engagement control of the one-way clutch 50 and the hydraulic brakes 60A, 60B during running of the vehicle in the case where the vehicle turns, namely the case where there is a rotational difference between the left and right electric motors 2A, 2B will be specifically described.

FIG. 20(a) is a collinear chart of the driving apparatus 1 in the case where the vehicle turns left during high speed cruising which is caused by the driving unit 6. In this state, the electric motor 2A which drives the left rear wheel LWr rotates in the reverse direction, and the electric motor 2B which drives the right rear wheel RWr rotates in the normal direction. The case where, by using the rotational difference between the left and right rear wheels LWr, RWr, regeneration (charging) is performed by the electric motor 2A which drives the left rear wheel LWr, and power driving (assist) is performed by the right rear wheel RWr will be described. At this time, as shown in FIG. 20(b), the target numbers of rotations of the electric motors 2A, 2B are decided in accordance with the numbers of rotations of the planetary carriers 23A, 23B, respectively, and, as shown in FIG. 20(b), the numbers of rotations of the electric motors 2A, 2B are coincident with the target numbers of rotations. Then, the regenerative braking torque (regenerative torque) and assist driving torque (power driving torque) of the electric motors 2A, 2B at this time are calculated. When the regenerative braking torque is larger, the hydraulic brakes 60A, 60B are engaged, and, when the assist driving torque is larger, the one-way clutch 50 is engaged. In FIG. 20(c), the assist driving torque of the electric motor 2B which drives the right rear wheel RWr is larger than the regenerative braking torque of the electric motor 2A which drives the left rear wheel LWr, and therefore the one-way clutch 50 is engaged.

Figure 21:
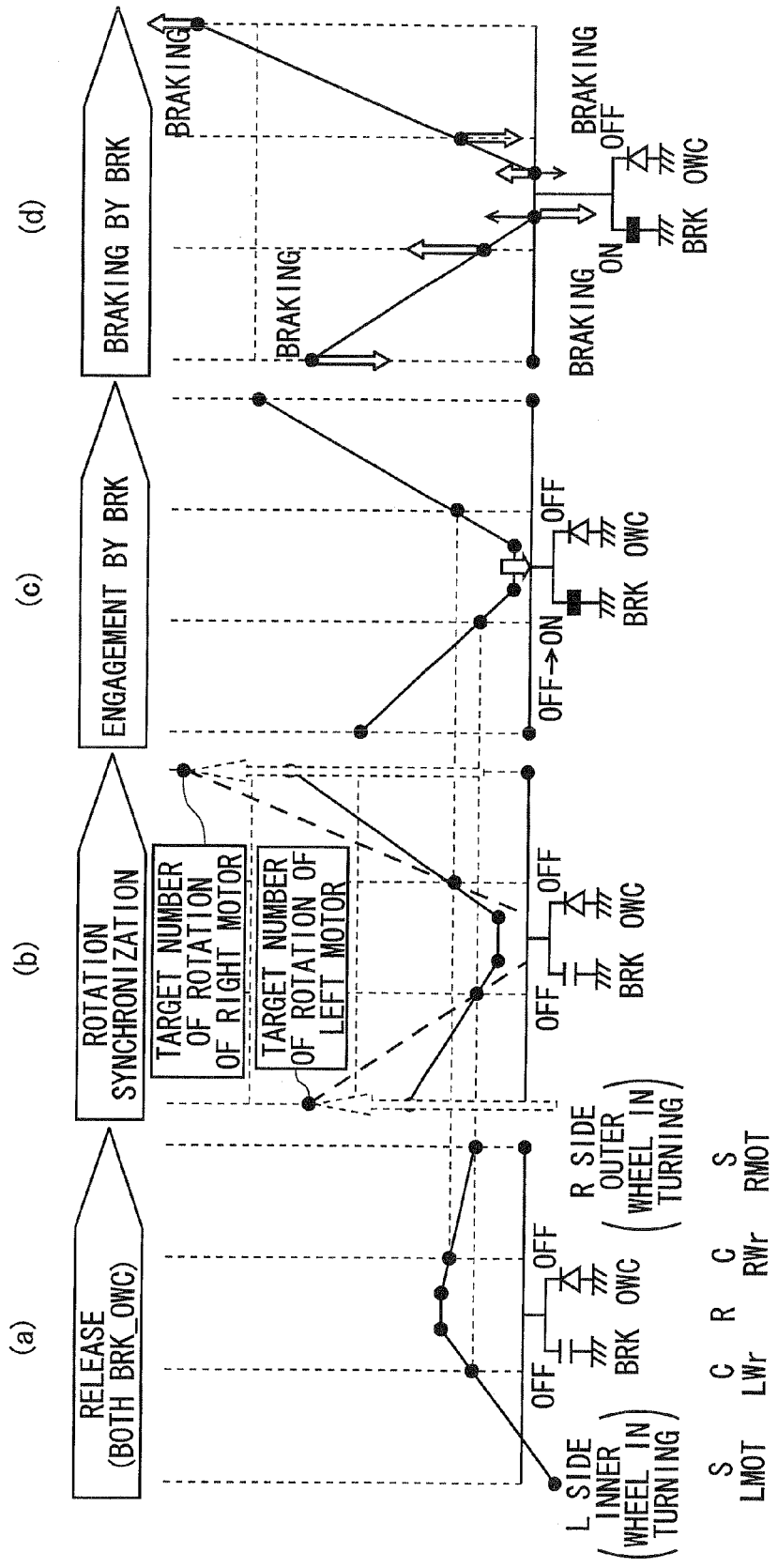
FIG. 21 shows an engagement control in which assist/regeneration is performed in a state where a rotational difference between the right and left electric motors is caused by turning of the vehicle, (a) is a collinear chart during turning, (b) is a collinear chart in rotation synchronization, (c) is a collinear chart in engagement of the hydraulic brakes, and (d) is a collinear chart in assist/regeneration.

By contrast, in the state FIG. 21(d), the regenerative braking torque of the electric motor 2A which drives the left rear wheel LWr is larger than the assist driving torque of the electric motor 2B which drives the right rear wheel RWr. Therefore, the target numbers of rotations of the electric motors 2A, 2B are decided in accordance with the numbers of rotations of the planetary carriers 23A, 23B as shown in FIG. 21(b), respectively, and, when the numbers of rotations become substantially equal to the target numbers of rotations as shown in FIG. 21 (c), the hydraulic brakes 60A, 60B are engaged, and the electric motors 2A, 2B output regenerative braking torques, whereby, as shown in FIG. 21(d), the electric motor 2A is allowed to perform charging, and the electric motor 2B is allowed to perform assist.

The control flow of the hydraulic controller of the driving apparatus 1 will be described with reference to FIG. 22.

Figure 22:
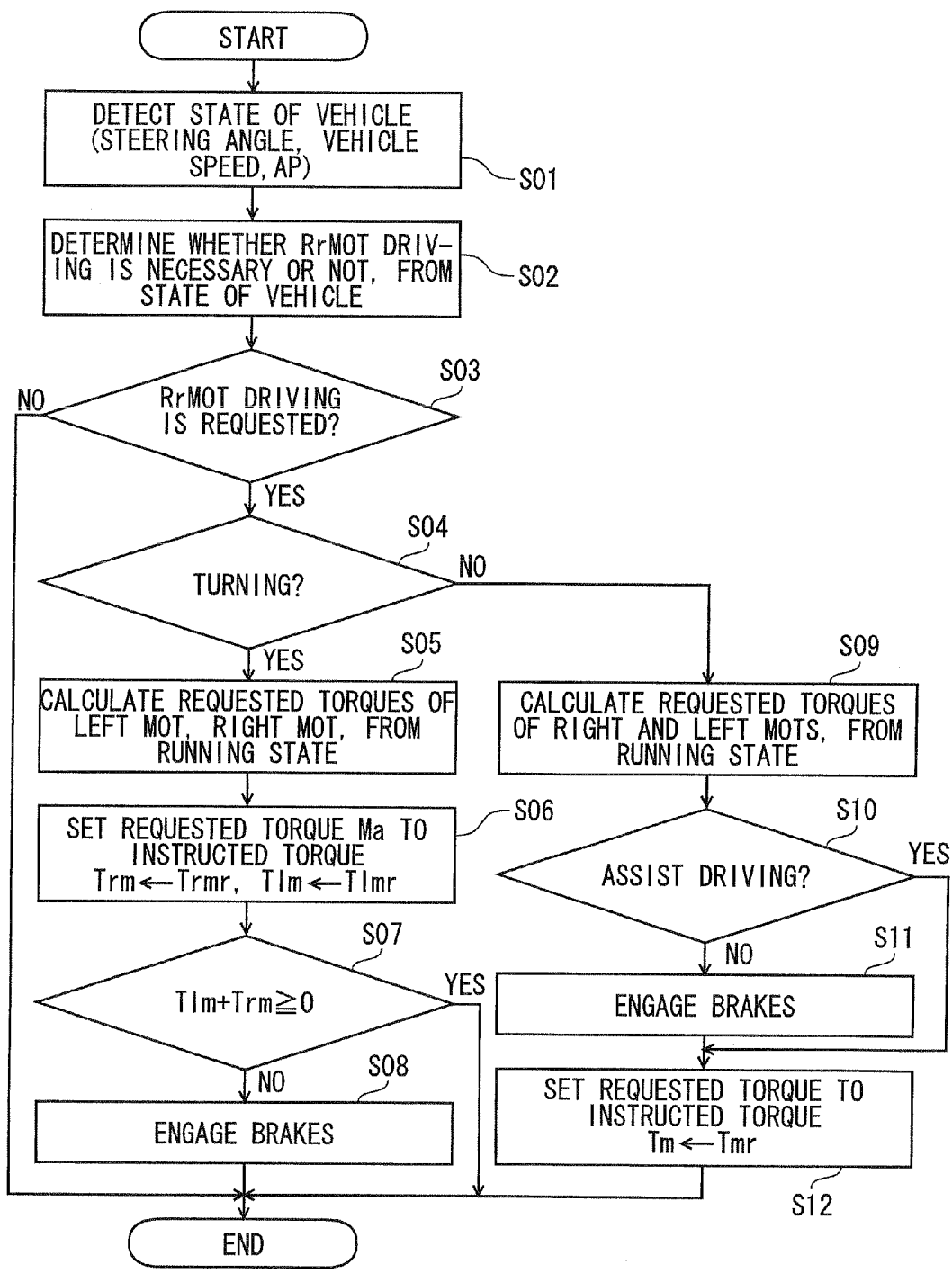
FIG. 22 is a flow chart of a control flow of the hydraulic control apparatus.

First, in step S01 shown in FIG. 22, the state of the vehicle (the vehicle speed, the steering angle, and the accelerator pedal opening degree AP) is detected. Next, in step S02, the running state estimator 46 determines from the state of the vehicle whether driving of the electric motors 2A, 2B of the driving apparatus 1 is necessary or not.

If there is no request for driving, the series of processes is ended (step S03). If, in step S03, there is a request for driving, it is then detected in step S04 whether the vehicle is turning or not. If the vehicle is turning, requested torques Tlmr, Trmr of the left and right electric motors 2A, 2B are calculated in step S05 from the running state by the torque calculator 47. In step S06, then, the requested torques Tlmr, Trmr are set to instructed torques Tlm, Trm. At this time, the assist driving torque has a positive value, and the regenerative braking torque has a negative value. In step S07, the sum of the instructed torques Tlm, Trm of the left and right electric motors 2A, 2B is calculated. If the sum of the instructed torques Tlm, Trm is positive, i.e., if the assist driving torque is larger than the regenerative braking torque, the one-way clutch 50 is automatically engaged, and therefore the series of processes is ended. On the other hand, if, in step S07, the sum of the instructed torques Tlm, Trm is negative, namely if the regenerative braking torque is larger than the assist driving torque, the hydraulic brakes 60A, 60B are engaged in order to connect the left and right electric motors 2A, 2B with the axles 10A, 10B (step S08).

If, in step S04, the vehicle is not turning, i.e., if the vehicle is straightly running, a requested torque Tmr of the left and right electric motors 2A, 2B is calculated in step S09 from the running state. During straight running, as described above, the requested torques of the left and right electric motors 2A, 2B have the same value. In step S10, then, it is detected whether assist driving is performed or not. If assist driving, the one-way clutch 50 is automatically engaged, and, if, in step S10, assist driving is not performed, i.e., if regenerative braking is performed, the hydraulic brakes 60A, 60B are engaged in order to connect the left and right electric motors 2A, 2B with the axles 10A, 10B (step S11). In step S12, then, the requested torque Tmr is set to the instructed torque Tm.

Figure 23:
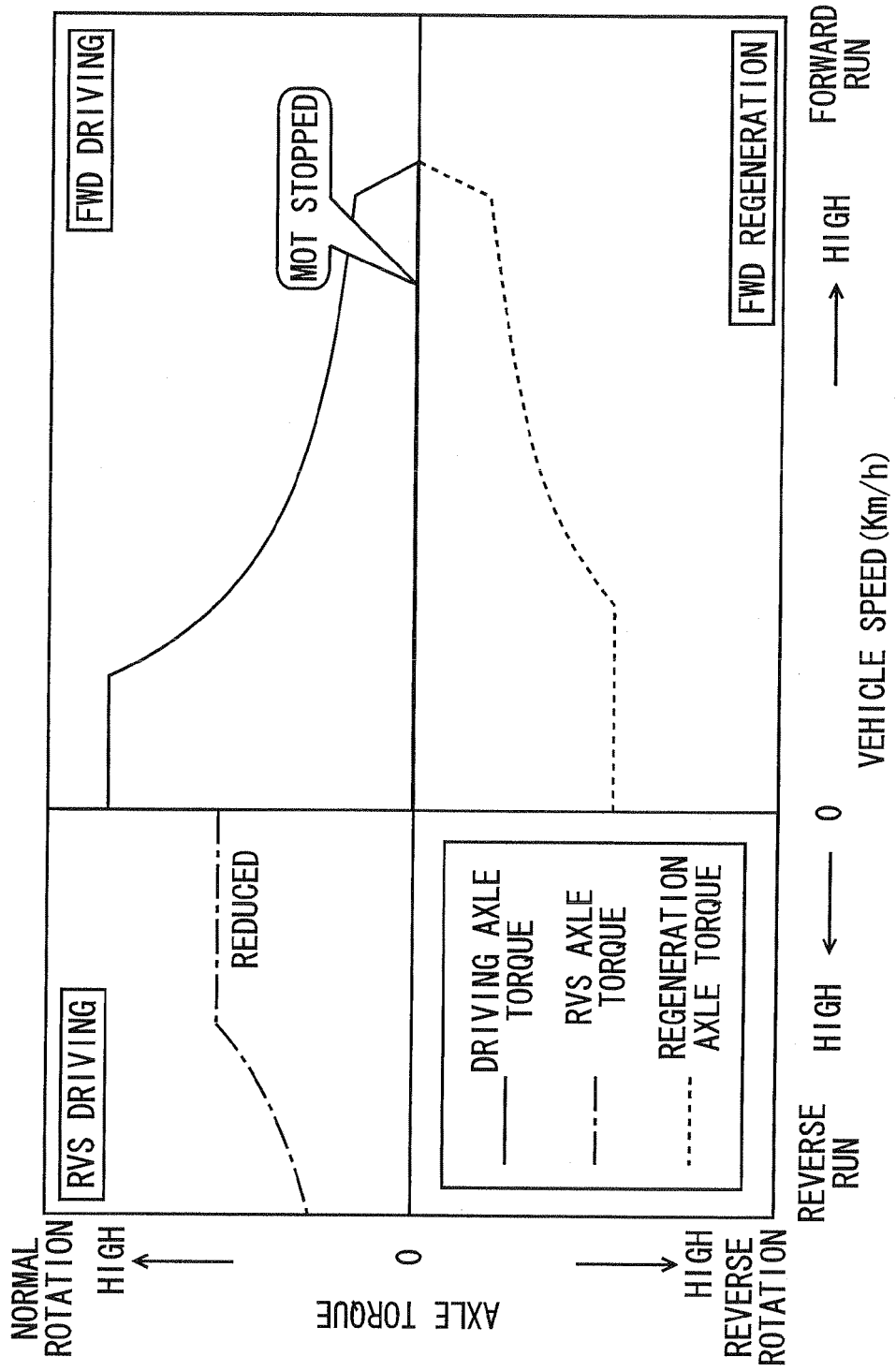
FIG. 23 is a driving force characteristic diagram of the electric motors of the driving apparatus.
Figure 24:
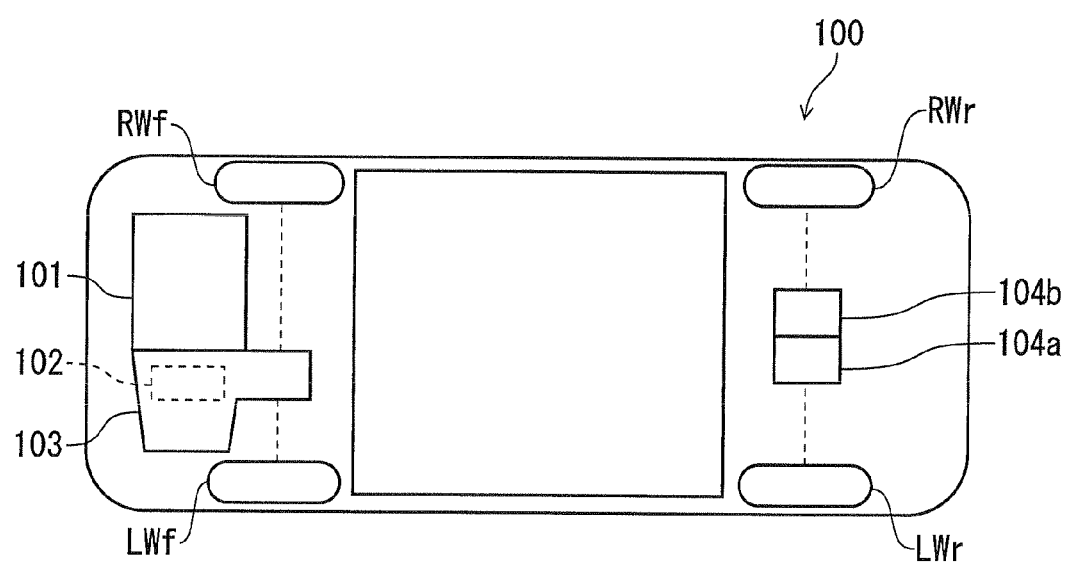
FIG. 24 is a block diagram schematically showing the configuration of a vehicle disclosed in Patent Reference 1.
Figure 25:
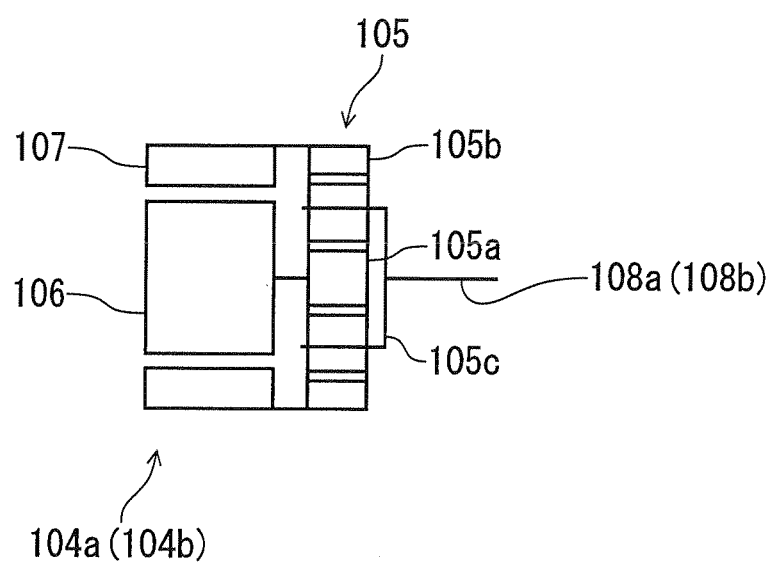
FIG. 25 is a view illustrating a planetary gear reducer coupled to a second motor in FIG. 24.

FIG. 23 is a driving force characteristic diagram of forward running (FWD driving), forward running regeneration (FWD regeneration), and reverse running (RVS driving) caused by the electric motors 2A, 2B of the driving apparatus 1. In the figure, the upper right portion indicates the axle torque in forward running (FWD driving), the lower right portion indicates that in forward running regeneration (FRD regeneration), and the upper left portion indicates that in reverse running (RVS driving).

As shown in FIG. 23, in the driving apparatus 1, the axle torques in FWD regeneration and RVS driving are set to be lower than the axle torque in FWD driving. In FWD regeneration and RVS driving, therefore, braking is performed by the hydraulic brakes 60A, 60B as described with reference to FIGS. 12 and 13, but the regenerative braking torque and the reverse torque are set to be low. Consequently, a low braking capacity may be used, and hence the stationary plates 35A, 35B and the rotary plates 36A, 36B can be reduced, so that the pumping loss can be reduced by a low oil pressure setting.

According to the vehicle 3 of the above-described embodiment, the planetary gear reducers 12A, 12B are disposed on the power transmission paths between the axles 10A, 10B and the electric motors 2A, 2B, and the one-way clutch 50 and the hydraulic brakes 60A, 60B are disposed between the ring gears 24A, 24B of the planetary gear reducers 12A, 12B and the reducer case 11. Therefore, the electric motors 2A, 2B can be decoupled from the left and right axles 10A, 10B, respectively, and hence can be prevented from being co-rotated.

In the case where one of the two electric motors 2A, 2B performs power driving and the other motor performs regenerative braking, releasing/engagement of the hydraulic brakes 60A, 60B is controlled based on the power driving torque and the regenerative braking torque. By using the rotational difference between the two electric motors 2A, 2B during turning of the vehicle 3, therefore, one of them can perform power driving, and the other can perform regeneration.

In the case where one of the two electric motors 2A, 2B performs power driving and the other motor performs regeneration, when the regenerative braking torque is larger than the power driving torque, the oil pressure controller 48 controls the hydraulic brakes 60A, 60B to be engaged. When the power driving torque is larger, therefore, it is not required to cause the hydraulic brakes 60A, 60B to be engaged. Namely, when the power driving torque acts, such as when the vehicle 3 is started to run, the one-way clutch 50 is engaged. Therefore, the responsibility in starting can be improved, and a situation where the electric oil pump 70 is operated in the high-pressure mode in a state where the oil temperature is low can be prevented from occurring.

The running state estimator 46 can detect turning of the vehicle 3 by estimating the running state of the vehicle 3 based on the speed of the vehicle 3, the accelerator opening degree, and the steering angle.

The invention is not limited to the above-described embodiment, and may be adequately subjected to modification, improvement, etc.

The vehicle 3 of the embodiment is not limited to a hybrid vehicle, and may be any vehicle including two electric motors which can independently output driving forces to right and left drive shafts, such as an electric vehicle or a fuel-cell vehicle.

Although the hydraulic brakes 60A, 60B have been exemplified as the brakes, the brakes are not limited to them. Known brakes such as electromagnetic brakes may be used.

The application is based on Japanese Patent Application (No. 2009-180061) filed Jul. 31, 2009, and the entire disclosure thereof is incorporated herein by reference.

DESCRIPTION OF REFERENCE NUMERALS AND SIGNS 2A electric motor
2B electric motor
10A axle (drive shaft)
10B axle (drive shaft)
11 reducer case
12A planetary gear reducer
12B planetary gear reducer
24A ring gear (first rotation element)
24B ring gear (first rotation element)
45 ECU
46 running state estimator
47 torque calculator
48 oil pressure controller
50 one-way clutch (one-way power transmitting device)
60A hydraulic brake (brake)
60B hydraulic brake (brake)
70 electric oil pump
Wf front wheel
LWr left rear wheel
RWr right rear wheel

The invention claimed is:

1. A vehicle comprising:
   two electric motors configured to output driving forces to right and left drive shafts independently, respectively;
   two planetary gear reducers disposed on a power transmission paths path between the right drive shafts shaft and a first electric motors motor of the two electric motors and on a power transmission path between the left drive shaft and a second electric motor of the two electric motors, respectively, wherein a first rotation element of one of the planetary gear reducers and a first rotation element of the other planetary gear reducer are connected to each other;
   a one-way power transmitting device disposed between first rotation elements connected to each other of the planetary gear reducers and a reducer case that accommodates the planetary gear reducers therein so as to transmit one-way rotational power;
   a brake that connects/disconnects the first rotation elements connected to each other and the reducer case, and configured to transmit two-way rotational powers of the electric motors to the drive shafts in a connection state;
   a running state estimator which estimates a running state of the vehicle;
   a torque calculator which calculates torques of the two electric motors; and
   a controller which controls the brake based on the running state of the vehicle estimated by the running state estimator, and
   wherein:
   when the vehicle runs forward and both the two electric motors power the vehicle, the controller releases the brake, when the vehicle runs forward and both the two electric motors perform regenerative braking, the controller actuates the brake, when the vehicle runs forward and one of the two electric motors powers the vehicle while the other motor performs regenerative braking, the controller releases or actuates the brake based on a power driving torque of said one of the two electric motors that powers the vehicle and a regenerative braking torque of the other motor that performs regenerative braking, and when one of the two electric motors powers the vehicle and the other motor performs regenerative braking and the regenerative braking torque is larger than the power driving torque, the controller actuates the brake.

2. The vehicle of claim 1, wherein the running state estimator estimates the running state of the vehicle based on a vehicle speed, an accelerator opening degree, and a steering angle of the vehicle.

3. The vehicle of claim 1, wherein the running state estimator estimates the running state of the vehicle based on a vehicle speed, an accelerator opening degree, and a steering angle of the vehicle.

* * * * *